United States Patent
Lerner et al.

(10) Patent No.: US 9,094,732 B2
(45) Date of Patent: Jul. 28, 2015

(54) RADIO FREQUENCY AUDIO/VIDEO SWITCH AND INTERNET PROTOCOL DISTRIBUTION APPLIANCE

(71) Applicant: Pico Digital Inc., San Diego, CA (US)

(72) Inventors: Ian Amihay Lerner, San Diego, CA (US); Brian Dale Trexel, San Diego, CA (US); Richard William Pecile, San Diego, CA (US); Roswell Reid Roberts, San Diego, CA (US); Pearse Adrian Ffrench, San Diego, CA (US); Paul Stephen Cooper, San Diego, CA (US); Cameron Eshghi Esfahani, San Diego, CA (US)

(73) Assignee: Pico Digital Inc., San Diego, CA (US)

( * ) Notice: Subject to any disclaimer, the term of this patent is extended or adjusted under 35 U.S.C. 154(b) by 277 days.

(21) Appl. No.: 13/918,764

(22) Filed: Jun. 14, 2013

(65) Prior Publication Data
US 2014/0373076 A1  Dec. 18, 2014

(51) Int. Cl.
*H04N 21/61* (2011.01)
*H04N 21/426* (2011.01)
*H04N 21/434* (2011.01)

(52) U.S. Cl.
CPC ..... *H04N 21/6156* (2013.01); *H04N 21/42615* (2013.01); *H04N 21/4347* (2013.01); *H04N 21/6175* (2013.01); *H04N 21/6193* (2013.01)

(58) Field of Classification Search
CPC .......... H04N 21/6156; H04N 21/4347; H04N 21/6175; H04N 21/6193; H04N 21/42615
See application file for complete search history.

(56) References Cited

U.S. PATENT DOCUMENTS

| | | | |
|---|---|---|---|
| 7,039,048 B1 | 5/2006 | Monta et al. | |
| 2009/0232077 A1* | 9/2009 | Krieger et al. | 370/329 |
| 2010/0180291 A1 | 7/2010 | Kahn et al. | |
| 2010/0239025 A1 | 9/2010 | Veljkovic et al. | |
| 2010/0325670 A1* | 12/2010 | Strong et al. | 725/71 |
| 2011/0059690 A1 | 3/2011 | Petruzzelli | |
| 2011/0191797 A1 | 8/2011 | Lee et al. | |
| 2012/0163290 A1 | 6/2012 | Krafft et al. | |
| 2013/0203338 A1* | 8/2013 | Ling et al. | 455/3.02 |
| 2014/0020019 A1* | 1/2014 | Carter et al. | 725/39 |

FOREIGN PATENT DOCUMENTS

WO  2007050081 Y  5/2007

OTHER PUBLICATIONS

ISR, PCT/US2014/042167, dated Oct. 30, 2014, 6 pages.

* cited by examiner

*Primary Examiner* — Jay P Patel
(74) *Attorney, Agent, or Firm* — ARC IP Law, PC; Joseph J. Mayo

(57) ABSTRACT

A switched radio frequency (RF) and Internet Protocol (IP) audio/video processing and distribution appliance that enables virtually any format of audio/video to be received, decrypted, transcoded, encrypted and distributed over a high speed IP backplane and output or modulated in a variety of formats. The system minimizes the number of points of failure to provide an extremely robust and cost effective solution for MDU and hospitality markets both in terms of initial cost and long-term maintenance costs.

20 Claims, 16 Drawing Sheets

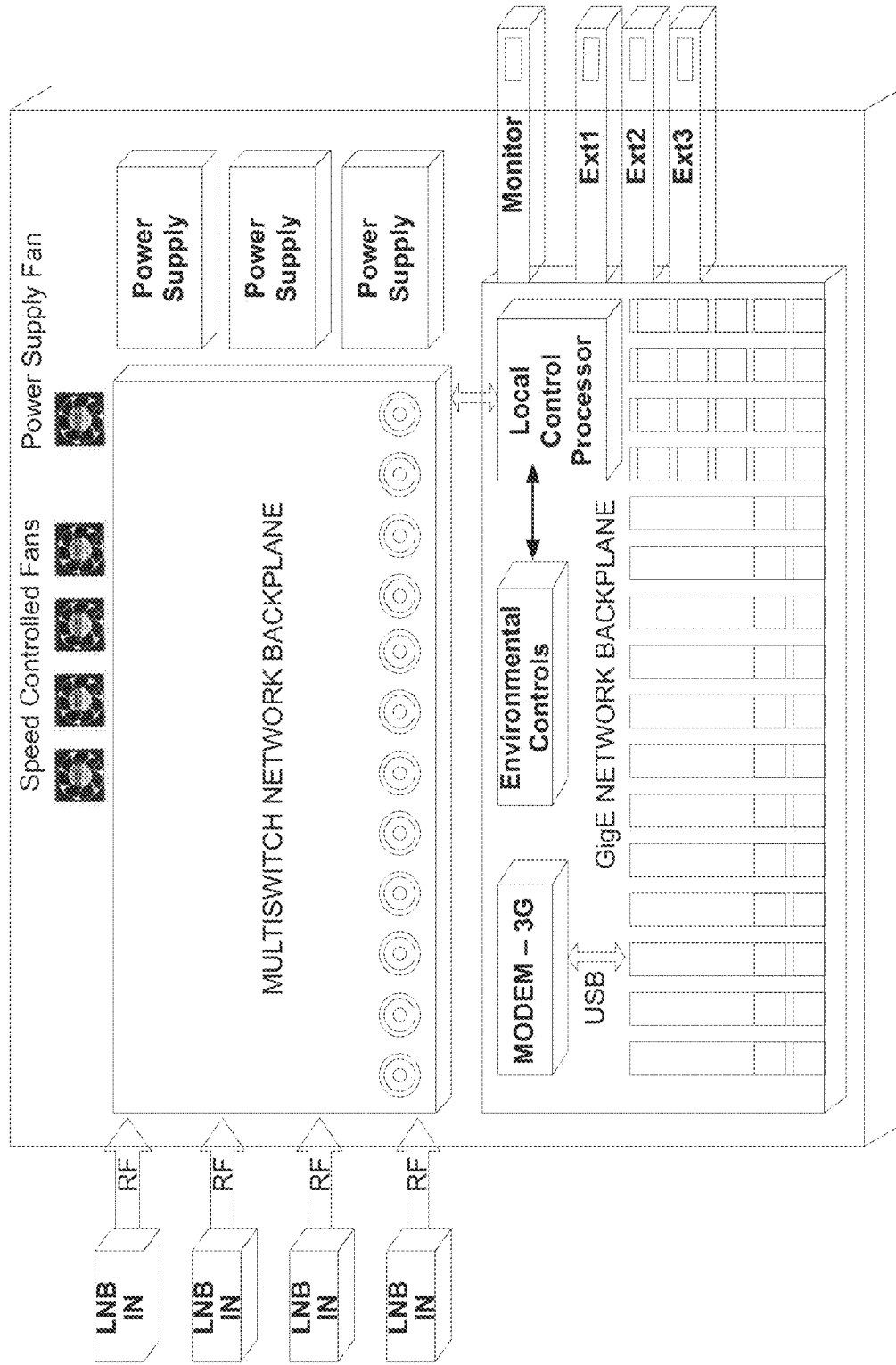

FIGURE 2A
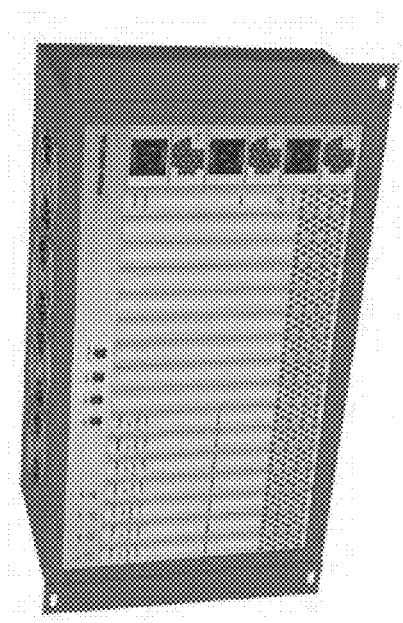
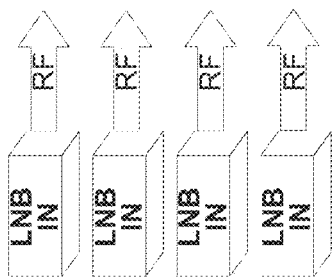
FIGURE 2B
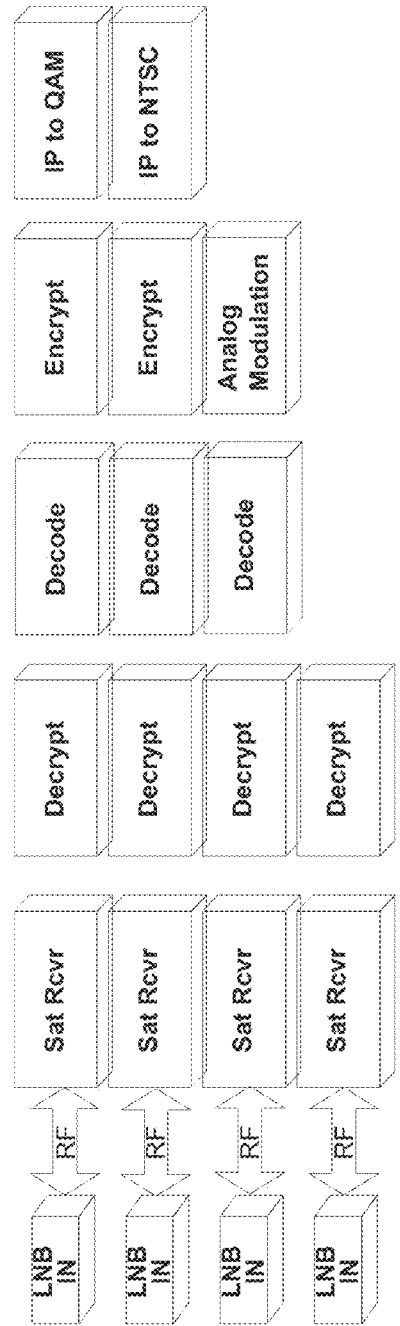
PRIOR ART

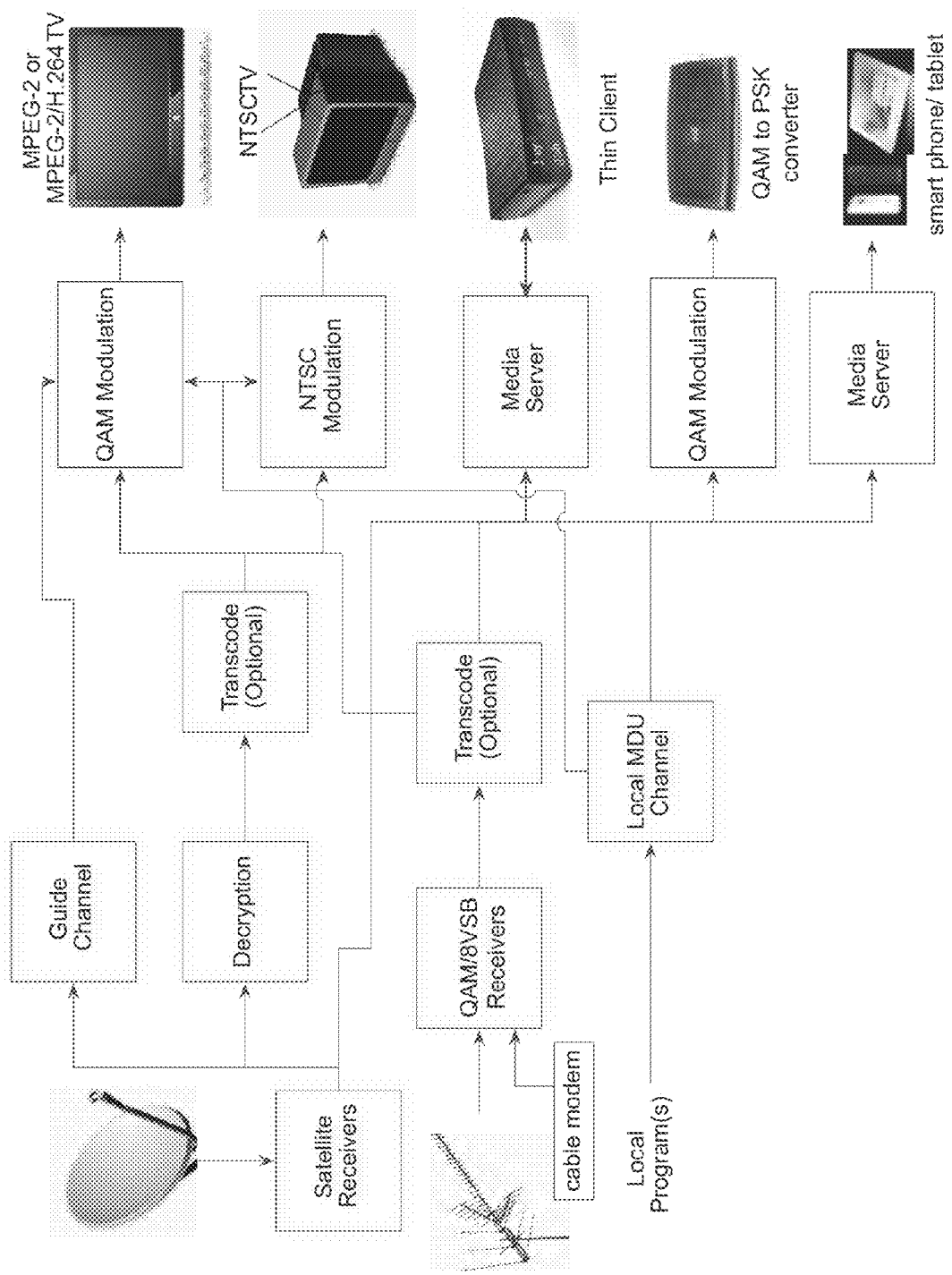

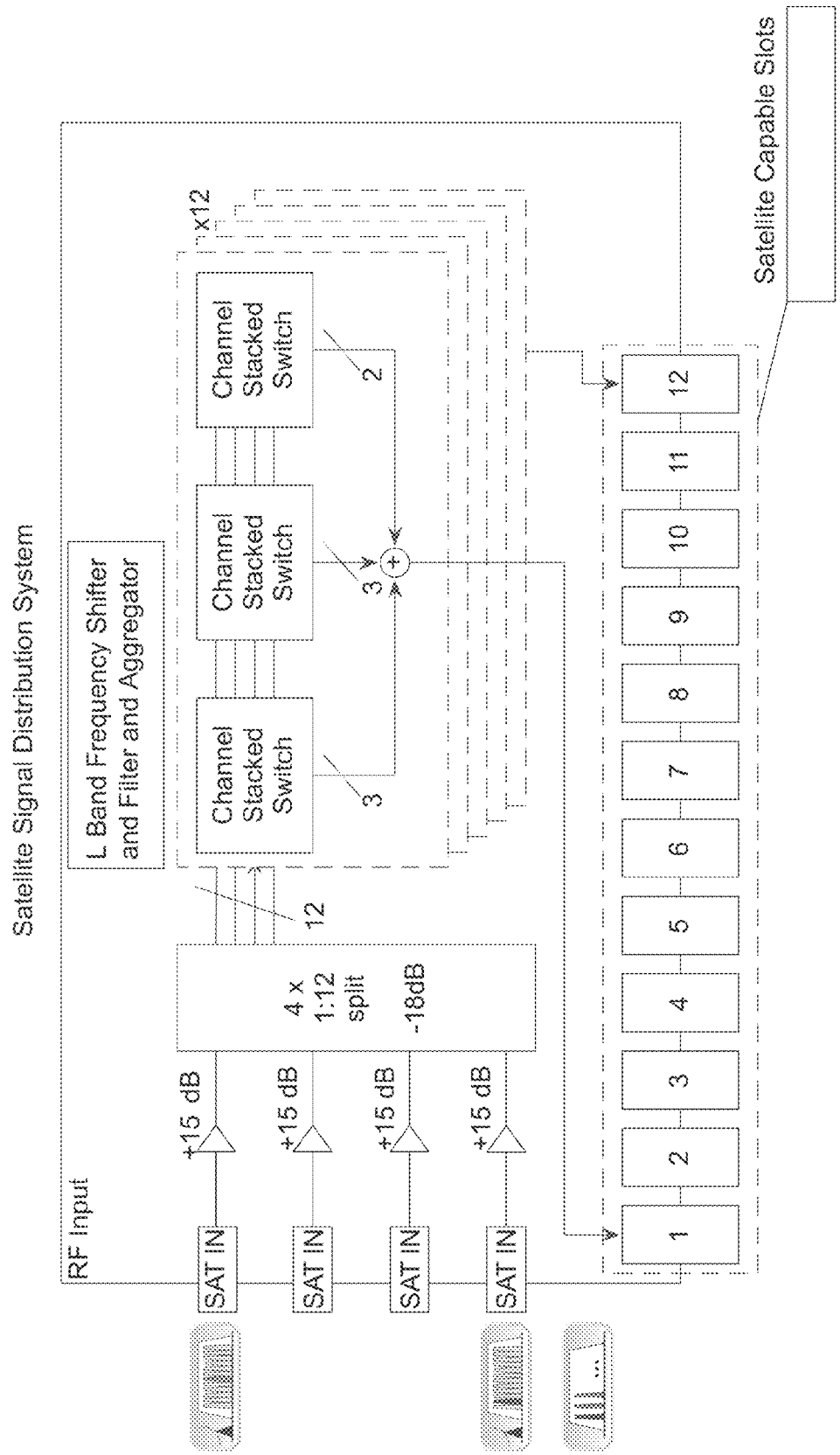

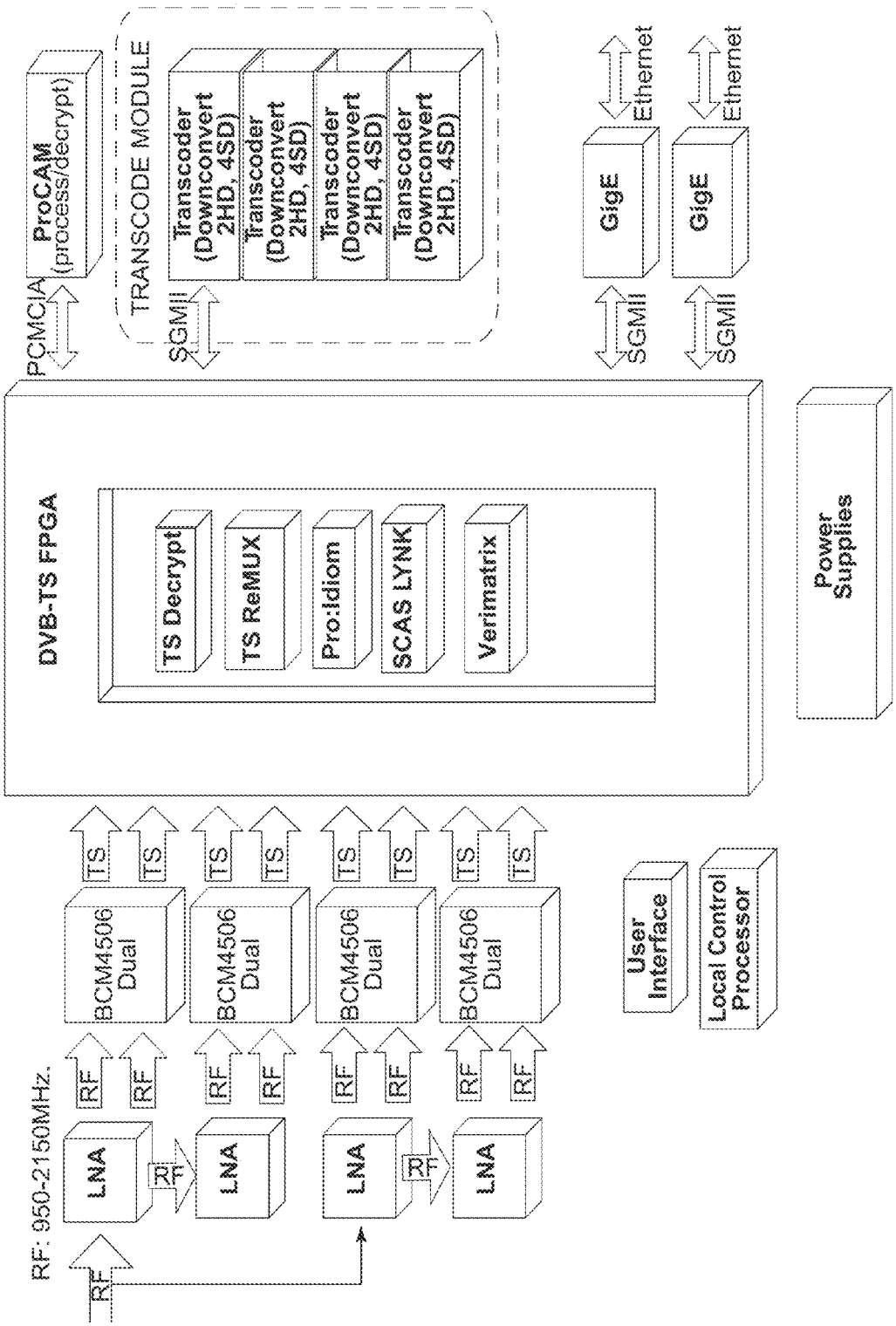

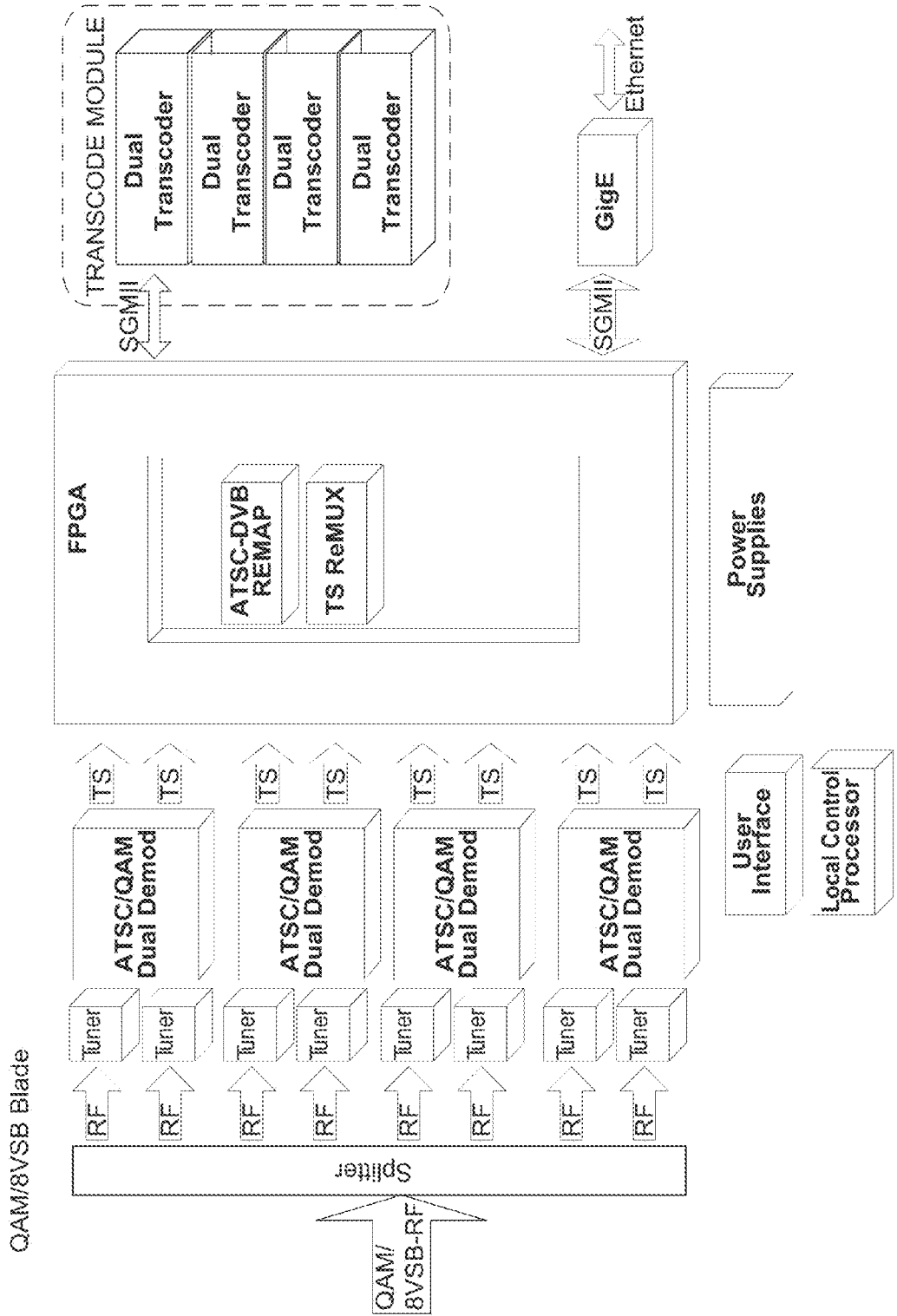

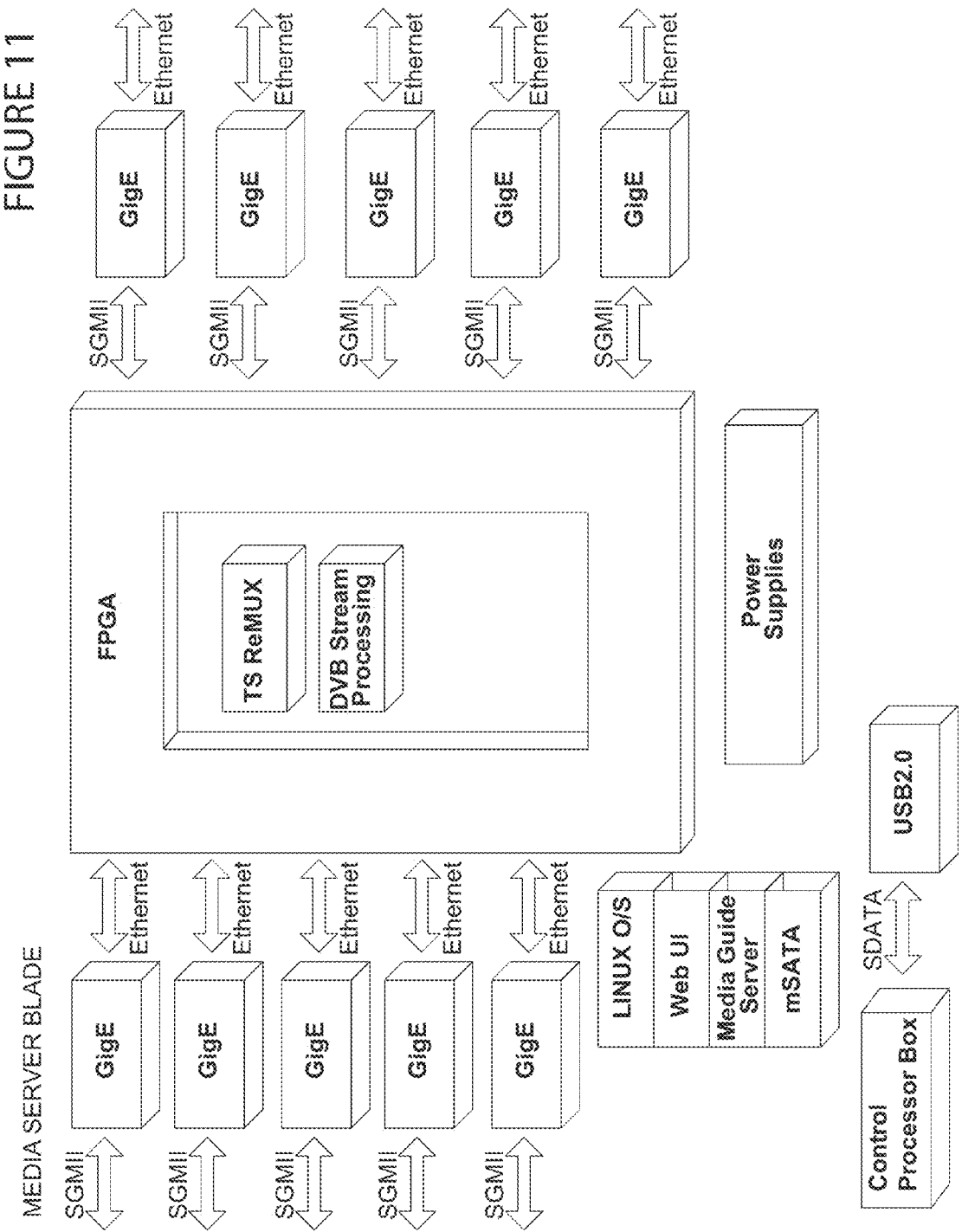

RADIO FREQUENCY AUDIO/VIDEO SWITCH AND INTERNET PROTOCOL DISTRIBUTION APPLIANCE

BACKGROUND OF THE INVENTION

1. Field of the Invention

One or more embodiments of the invention are related to the field of radio frequency audio/video receivers, for example satellite and over-the-air television receivers. More particularly, but not by way of limitation, one or more embodiments of the invention enable a switched radio frequency (RF) and Internet Protocol (IP) audio/video processing and distribution appliance that enables virtually any format of audio/video to be received, decrypted, transcoded, encrypted and distributed over a high speed IP backplane and output or modulated in a variety of formats.

2. Description of the Related Art

Current solutions for receiving satellite and terrestrial or "over-the-air", or "off-air" broadcasts require multiple systems that are generally hardwired in one or more non-robust configurations having large numbers of points of failure. These types of solutions make multi-dwelling unit (MDU) and hospitality solutions costly both in terms of initial cost and in addition, in terms of long-term maintenance costs. In addition, known solutions require technicians to configure and maintain ad hoc systems that make short-term tenants unprofitable from the viewpoint of satellite distribution companies for example.

Typical solutions require multiple chassis and communications protocols to interact and deliver desired content from a given satellite or over-the-air source to a particular type of video monitor. For example, typical systems may utilize a separate chassis for any or all of the following processing: conditional access (CA) systems, off-air signal processing and QAM modulators, e.g., for format conversion for television viewing, switching and routing systems, transcoders and encoders for bandwidth and picture size modification, video-on-demand (VOD), local and advertisement insertion equipment, satellite receivers and direct broadcast equipment. This amount of equipment is costly to purchase, consumes space and power, requires personnel knowledgeable across many devices and systems and provide many points of failure.

For at least the limitations described above there is a need for a switched RF and IP audio/video processing and distribution appliance, for example that replaces multiple systems with a robust, low point of failure, easy and cost effective to maintain apparatus.

BRIEF SUMMARY OF THE INVENTION

One or more embodiments described in the specification are related to a switched RF and IP audio/video processing and distribution appliance that enables virtually any format of audio/video to be received, decrypted, transcoded, encrypted and distributed over a high speed IP backplane and output or modulated in a variety of formats. The system minimizes the number of points of failure to provide an extremely robust and cost effective solution for MDU and hospitality markets both in terms of initial cost and long-term maintenance costs.

At least one embodiment of the invention includes a radio frequency L Band switch configured to receive a two or more radio frequency signals from respective Low Noise Blocks (LNBs) coupled with at least one external satellite dish. Embodiments of the invention receive the radio frequency signals from the LNBs and internally switch or route them to a particular receiver card. Thus, embodiments of the invention eliminate the need to communicate with LNBs using a variety of communications protocols typical employed to select a particular transponder for example. The radio frequency signals are provided to the satellite receivers coupled with the radio frequency L Band switch and as routed by the L Band switch, for example as commanded by a controller. The satellite receivers output digital representations of the input radio frequency signals to an Internet Protocol bus that is coupled with the satellite receivers. The Internet Protocol bus is configured to communicate digital information output from the satellite receivers using Internet Protocol packets for example. Embodiments also include at least one output modulator that is configured to receive the information in Internet Protocol format and output the information in a predetermined signal format compatible with at least one desired type of audio/visual equipment, for example that receives QAM, NTSC or IP format information. Embodiments also include a controller coupled with at least the radio frequency L Band switch that is configured to select the specific radio frequency signals from the Low Noise Blocks to provide to the satellite receivers. In other words, the controller determines the mapping of the satellite signals to the various receivers and if one of the receivers fails, the controller can internally command the radio frequency L Band switch to route incoming signals to a different receiver. The switching of signals to a different receiver card may be performed without unplugging cables and for example through use of a priority mapping wherein higher priority channels are routed, while at least one lesser priority channel is not routed to a receiver. In this scenario, the system continues to work, albeit with a reduced number of channels. Embodiments of the invention are deployed in a chassis configured to hold the aforementioned components, and may also include an QAM/8VSB receiver configured to receive off-air radio frequency television signals, for example ATSC signals, wherein the QAM/8VSB receiver is coupled with the Internet Protocol bus.

In one or more embodiments, the system is highly redundant and minimizes the number of points of failure. For example, the controller may be configured to select a particular one of the plurality of satellite receivers as a master and switch the master to a different card or blade if a particular satellite receiver card fails, e.g., that was the master before failing.

In one or more embodiments, the radio frequency L Band switch is configured to output the plurality of radio frequency signals at a fixed set of frequencies for each of the plurality of satellite receivers. In this manner, the satellite receivers already are configured to receive a fixed set of input frequencies regardless of the output frequencies of the LNBs. The plurality of satellite receivers are configured to demodulate the radio frequency signals to convert the electrical signals into digital format. As incoming input streams may be in multiplexed format to enable a given satellite transponder to transmit many services at a time, the satellite receivers are also configured to demultiplex data associated with the radio frequency signals into Single-Program Transport Streams. In one or more embodiments, the plurality of satellite receivers are configured to decrypt the Single-Program Transport Streams, for example to transcode the Single-Program Transport Streams into a different format, although this is not required. One or more embodiments are also configured to encrypt the Single-Program Transport Streams, for example so that no digital rights management or DRM license is required to transmit unencrypted signals.

Embodiments of the invention also include at least one output modulator to output the digital format for viewing on the desired type of television, optionally through a set-top box. For example, embodiments of the output modulator may include a QAM output processor, an NTSC output processor or may include a media server configured to provide rich guide content and programs to thin clients over Internet Protocol. Embodiments may also output data including control data and/or channels for example with an output modulator that includes a wireless modem of any type, or for example a 3G or a 4G or an LTE modem.

Embodiments of the invention may also include an SPTS input configured to receive a Welcome Channel, security feed or advertisement feed. The channels/feeds may be specific to a particular installation or location. In this manner, a specific hotel welcome channel may be provided as the default channel when a television is powered on in a hotel. Advertisement feeds may also be targeted at the particular location so as to provide marketing opportunities for the hotel or businesses associated with the hotel or near a multi-dwelling unit or MDU. Any type of data may be input into the system over the SPTS input for example.

Embodiments may include further robust commercial features that ensure that the system continues to operate even after card or other hardware failures. For example, embodiments of the system may include at least one temperature sensor within the chassis and coupled with the controller and wherein the controller is configured to command at least one of the plurality of satellite receivers to stop processing at least one of the radio frequency signals if at least one temperature sensor detects a temperature over a predefined temperature value.

Alternatively, or in combination, embodiments of the system may include at least one fan within the chassis having a speed sensor coupled with the controller, wherein the controller is configured to command the at least one of the plurality of satellite receivers to stop processing at least one of the radio frequency signals if the speed sensor detects a speed under a predefined speed value.

Other robust embodiments may include any combination of processing, temperature or fan speed to lower the heat or power utilization of the chassis to ensure that processing continues. For example, one or more embodiments assign a priority to at least one of the radio frequency signals, wherein the priority is utilized to determine which of the radio frequency signals to continue to process in case of bandwidth or processing overload of any component within the chassis, or if a temperature within the chassis exceeds a predefined temperature value or a speed of a fan within the chassis falls beneath a predefined speed value.

Embodiments of the invention may also utilize any number of power supplies to power the various components in the chassis, wherein the at least one power supply is hot-swappable.

BRIEF DESCRIPTION OF THE DRAWINGS

The above and other aspects, features and advantages of the invention will be more apparent from the following more particular description thereof, presented in conjunction with the following drawings wherein:

FIG. 1 illustrates an architectural view of at least one embodiment of the switched RF and IP audio/video processing and distribution appliance.

FIG. 2A illustrates an architectural view of an embodiment of the invention, while FIG. 2B illustrates an architectural view of a prior art system.

FIGS. 4A and 4B illustrate two exemplary embodiments of the invention for hospitality and MDU installations respectively.

FIG. 5 illustrates an architectural diagram of the radio frequency switch portion of an embodiment of the invention.

FIG. 6A illustrates other details of the satellite receiver card or blade.

FIG. 7 illustrates an architectural diagram of the off-air or QAM/8VSB receiver card or blade.

FIG. 10 illustrates an architectural diagram of the QAM modulator card or blade, while

FIG. 11 illustrates an architectural diagram of the Media modulator card or blade.

DETAILED DESCRIPTION OF THE INVENTION

Figure 3:
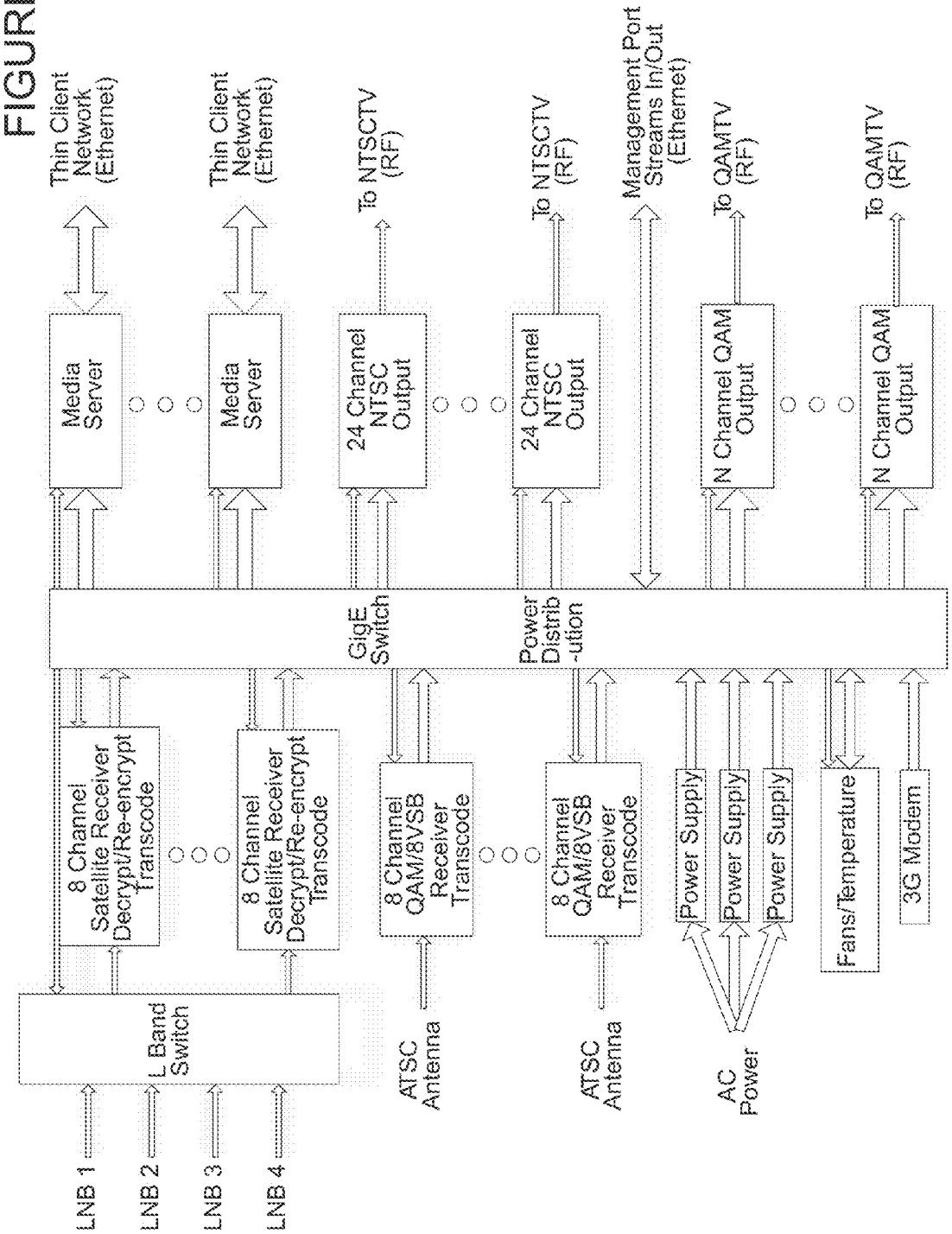
FIG. 3 illustrates a logical data flow view of an embodiment of the invention.

A switched RF and IP audio/video processing and distribution appliance will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 illustrates an architectural view of at least one embodiment of the switched RF and IP audio/video processing and distribution appliance. As shown, multiple LNB inputs arrive at the chassis as radio frequency inputs, for example using F-connectors. The signals are routed to any number of receiver cards, for example 12 satellite receiver cards, and based on any desired mapping. The chassis may include multiple fans, redundant power supplies and other ports such as Monitor Ethernet port for setup, and External ports 1-3 as shown for Ethernet communications. Internally, the chassis may also include a local processor that is configured to minimize the number of points of failure. The processor may couple with environmental controls that provide temperature and fan speed readings, so that processing may be reduced based on high temperature, low fan speed, or other measured characteristics, including but not limited to Ethernet backplane traffic and card processing utilization. Although embodiments of the invention are shown with a specific number of inputs and outputs, one skilled in the art will recognize that the system is expandable up to the amount of bandwidth employed in the various components and backplane and the exemplary embodiment shown is not intended to be limiting in any manner.

FIG. 2A illustrates an architectural view of an embodiment of the invention, while FIG. 2B illustrates an architectural view of a prior art system. As shown, one or more satellite antennas having one or more LNB's couple to an embodiment of the system as shown on the front panel of the chassis. The components of the system described below are generally all internal to the chassis, including the satellite receiver cards, QAM/8VSB receiver cards, IP backplane, output modulators, power supplies, therein providing a single chassis solution for hospitality and MDU commercial receiver applications. FIG. 2B on the other hand shows the number of separate components used in known multi-chassis solutions that have for example hardwired connections to between the satellite receivers and LNB's. In addition, the connections between the satellite receivers and the LNB's may be bi-directional since the satellite receivers may send commands to the LNB's to alter their output frequencies, etc.

Embodiments of the invention generally eliminate the need to communicate to the LNB's or otherwise command them, since their inputs are switched internally to desired satellite receiver cards. If a satellite receiver fails on the prior art system, then the hardwired connection must be disconnected and reconnected to a different satellite receiver if the LNB is providing high priority channels for example. The satellite receivers then must be reconfigured to make up for the failed receiver channels. The prior art system generally requires multiple separate chassis and hence power supplies for decryption, transcoding, encryption and modulation.

FIG. 3 illustrates a logical data flow view of an embodiment of the invention. At least one embodiment of the invention includes a radio frequency L Band switch configured to receive a plurality of radio frequency signals from a respective plurality of Low Noise Blocks (LNBs) shown in the upper left portion of the figure, that are coupled with at least one external satellite dish (not shown for brevity). As embodiments of the invention receive the radio frequency signals from the LNBs and internally switch or route them to a particular receiver card, embodiments of the invention eliminate the need to communicate with LNBs using a variety of communications protocols typical employed to select a particular transponder for example. The radio frequency signals are provided to a plurality of satellite receivers coupled with the radio frequency L Band switch, and shown to the right of the switch, and as determined by the L Band switch, for example as commanded by a controller. The satellite receivers output digital representations of the input radio frequency signals to an Internet Protocol bus that is coupled with the plurality of satellite receivers. In one embodiment, there are up to 12 satellite receiver cards or blades, each of which processes up to 8 radio frequency channels. The Internet Protocol bus is configured to communicate digital information output from the plurality of satellite receivers with Internet Protocol and in one embodiment the backplane may be implemented with a 10 Gbps IP switch. Embodiments also include at least one output modulator that is configured to receive the information in Internet Protocol format and output the information in a predetermined signal format compatible with a first type of audio/visual equipment, for example QAM, NTSC or IP via a media server and as is shown from the lower right to the upper right in the figure. Embodiments also include a controller, (shown in FIG. 1), coupled with at least the radio frequency L Band switch that is configured to select the specific plurality of radio frequency signals from the plurality of Low Noise Blocks to provide to the plurality of satellite receivers. In other words, the controller determines the mapping of the satellite signals to the various receivers and if one of the receivers fails, the controller can internally command the radio frequency L Band switch to route incoming signals to a different receiver, for example using a priority mapping wherein higher priority channels are retained and the system continues to work, albeit with a reduced number of channels. Embodiments of the invention are deployed in a chassis as is shown in FIG. 1, wherein the chassis is configured to hold the aforementioned components, and may also include an QAM/8VSB receiver, shown as 8 channel receivers below the satellite receivers in the figure, wherein the QAM/8VSB receivers are configured to receive off-air radio frequency television signals, such as ATSC signals, or other signals for example for example from a cable modem as is shown in FIG. 4. The QAM/8VSB receivers are coupled with the Internet Protocol bus. Also shown are the power supplies and fans.

In one or more embodiments, the system is highly redundant and minimizes the number of points of failure. For example, the controller may be configured to select a particular one of the plurality of satellite receivers as a master and switch the master to a different card or blade if a particular satellite receiver card fails, e.g., that was the master.

In one or more embodiments, the radio frequency L Band switch is configured to output the plurality of radio frequency signals at a fixed set of frequencies for each of the plurality of satellite receivers. In this manner, the satellite receivers already are configured to receive a fixed set of input frequencies regardless of the output frequencies of the LNBs. The plurality of satellite receivers are configured to demodulate the radio frequency signals to convert the electrical signals into digital format. As incoming input streams may be in multiplexed format to enable a given satellite transponder to transmit many services at a time, the satellite receivers are also configured to demultiplex data associated with the radio frequency signals into Single-Program Transport Streams. In one or more embodiments, the plurality of satellite receivers are configured to decrypt the Single-Program Transport Streams, for example to transcode the Single-Program Transport Streams into a different format, although this is not required.

Transcoding for example is utilized to convert from MPEG-2 to H.264 or visa versa since some of the attached devices, such as televisions or set-top boxes only work with one format or the other. One or more embodiments are also configured to encrypt, or actually re-encrypt the Single-Program Transport Streams, for example so that no digital rights management or DRM license is required to transmit unencrypted signals. The SPTS programs may be encrypted using the Pro:Idiom™ or Lynk™ encryption protocols for hospitality applications, or any other desired protocol depending on the desired application. Some decrypted SPTS programs are not re-encrypted, in some cases except for transmission across the backplane, since they may be transmitted as either NTSC output or in the "clear" for a bulk TV application. The QAM/8VSB receivers also demodulate the incoming ATSC feeds, which are not encrypted, and provide the main ATSC program as an SPTS with possible transcoding. The SPTS programs can also be passed out of the satellite receivers fully encrypted, and embodiments may employ a mode to pass the full MPTS satellite feed directly out which can be fed directly into the QAM output for QAM to PSK Converter applications.

The SPTS programs are sent from the two receiver card types across the GigE backplane to the output cards: Media Server, NTSC Output, and QAM Output. All protected programs may be encrypted using DTCP, Pro:Idiom™ or Lynk™ encryption when sending across the backplane. The Media Server card receives requests from "Thin Clients", e.g. IP Clients, and may provide both SPTS programs as UDP/IP streams and program guide content. These are provided on any number of outputs, for example 5 Ethernet outputs on the Media Server in one or more embodiments although the number of outputs may vary depending on the desired application. The QAM Output card can operate in one of the Annex A/B/C modes at a time. Annex B mode may be utilized for distribution of bulk "clear" TV programs. Annex A may be utilized to support Q-Box applications. The NTSC output may be utilized to provide up 24 channels of NTSC output per card in one or more embodiments. In addition, SPTS programs may be provided as UDP/IP on input/output Ethernet data ports that may for example be located on the front of the chassis.

Local SPTS streams may be provided to for applications like Welcome Channel, security feed, and ad insertion through one of the three IP input/output data ports on the unit. These streams are sent through the backplane to one of the output cards for output as configured by the user.

The backplane provides a high bandwidth switching fabric for high throughput of all the SPTS programs and other data. The smaller arrows in FIG. 3 indicate 2 Gbps of bandwidth and the larger purple arrows indicate 5 Gbps of bandwidth, although other speeds may be implemented depending on the application. The backplane may also assign the master controller card in the unit, or example as directed by the controller, or autonomously, and monitors the status of each of the cards and power supplies plugged into the chassis. In addition, the backplane module may also implement temperature monitoring and fan control.

The channel information and program guide may also be passed from the Satellite and ATSC receivers to the output modules both for inclusion as binary data for thin clients and Q-Boxes, but also for the creation of Guide and Program listing video channels for the hospitality or bulk TV applications.

Control and status communication to/from the Commercial Receiver may be accomplished through the Ethernet port or the 3G modem. A web based user interface may be utilized to configure and receive status through these ports.

The embodiment shown in FIG. 3 may for example be implemented with 4 LNB inputs, 16 slots, Ethernet ports for management and data, and three power supply slots. In one or more embodiments, 12 slots support Satellite RF connections and are implemented with 2 Gbps speed slots. In addition, one or more embodiments may employ 4 slots support up to 5 Gbps data bandwidth. Any other mix or bandwidth level cards may be employed based on the desired application.

Embodiments of the invention also include at least one output modulator to output the digital format for viewing on the desired type of television, optionally through a set-top box. For example, embodiments of the output modulator may include a QAM output processor, an NTSC output processor or may include a media server configured to provide rich guide content and programs to thin clients over Internet Protocol. Embodiments may also output data including control data and/or channels for example with an output modulator that includes a wireless modem of any type, or for example a 3G or a 4G or an LTE modem. For example, in one or more embodiments, the Ethernet backplane contains a mini-PCI Express connector to support a cellular modem module. This connector may be electrically compatible with the mini-PCI Express standard, for example via a data interface compatible with the USB 2.0 bus.

The backplane routes the USB signals of the modem module to a USB switching circuit to allow for any of the 12 input blade slots to utilize the module. Upon startup backplane switch generally leaves the modem module's USB interface disconnected and holds the modem in reset until a master blade is selected for the system. Once a master is selected, the USB switching circuit is configured to connect the master blade to the module. This circuit also connects the module's reset line to the master blade to allow the master blade to pull the module out of reset or force a reset at a later time if necessary. Once a master blade is given control over the modem module, it generally proceeds to issue AT commands to connect the module to the network and maintain connectivity.

Embodiments of the invention may also include an SPTS input configured to receive a Welcome Channel, security feed or advertisement feed. The channels/feeds may be specific to a particular installation or location. In this manner, a specific hotel welcome channel may be provided as the default channel when a television is powered on in a hotel. Advertisement feeds may also be targeted at the particular location so as to provide marketing opportunities for the hotel or businesses associated with the hotel or near a multi-dwelling unit or MDU. Any type of data may be input into the system over the SPTS input for example. These streams are sent through the backplane to one of the output cards for output as configured into the system.

Embodiments may include further robust commercial features that ensure that the system continues to operate even after card or other hardware failures. For example, embodiments of the system may include at least one temperature sensor within the chassis and coupled with the controller and wherein the controller is configured to command at least one of the plurality of satellite receivers to stop processing at least one of the radio frequency signals if at least one temperature sensor detects a temperature over a predefined temperature value.

Alternatively, or in combination, embodiments of the system may include at least one fan within the chassis having a speed sensor coupled with the controller, wherein the controller is configured to command the at least one of the plurality of satellite receivers to stop processing at least one of the radio frequency signals if the speed sensor detects a speed under a predefined speed value.

Other robust embodiments may include any combination of processing, temperature or fan speed to lower the heat or power utilization of the chassis to ensure that processing continues. For example, one or more embodiments assign a priority to at least one of the radio frequency signals, wherein the priority is utilized to determine which of the radio frequency signals to continue to process in case of bandwidth or processing overload of any component within the chassis, or if a temperature within the chassis exceeds a predefined temperature value or a speed of a fan within the chassis falls beneath a predefined speed value.

Embodiments of the invention may also utilize any number of power supplies to power the various components in the chassis, wherein the at least one power supply is hot-swappable.

In one or more embodiments, each card or blade in the system selects MAC addresses based upon that blade's slot ID. For blades with several Ethernet interfaces, a system-unique MAC address is selected for each interface. IP addresses are selected similarly. By the end of the MAC/IP assignment, a blade has a MAC and IP address for each Ethernet interface connected to an FPGA and for the host processor on the blade. The Ethernet switch may have address learning disabled on all internal ports by default. The switching table is populated manually as cards are registered. External ports may still use learning to determine which Ethernet interface traffic should be directed to.

Once a blade is booted and has its FPGA loaded, it generally proceeds to send a registration packet destined for the Ethernet switch, which may be located in one or more embodiments at a designated IP address. In one or more embodiments, the registration packet contains information about the card including its serial number, software version, paired backplane's serial number, and a timestamp of its last known configuration version. If the switch determines that the blade should not be able to communicate in the system, the blade is blocked and the event may be reported to the current master of the system (if one exists).

Once the registration packet is received and validated, the switching table is generally updated to reflect the new blade. Next a registration response is generally sent, indicating to the blade who the current master of the system is, what the current timestamp of the latest configuration version is, and what the device's external MAC address and IP settings are. Once this response is received, the blade updates its configuration accordingly, becoming a master if necessary. If a board becomes the master of the system, it assigns itself the MAC and IP configuration given to it by the switch along with the local domain IP addressed used to communicate with the other blades. Doing this simplifies the interface to the outside world. Regardless of which blade is the master of the system, the chassis always appears to have the same MAC address and appears to be a single device.

At this point in the initialization sequence, the blade is able to communicate with other blades in the system. Synchronization occurs in one or more embodiments before moving forward, and the blade may check in with the master for the latest configuration and software version.

In one or more embodiments, control traffic between blades is performed using the first Ethernet interface in the slot. This traffic passes through the FPGA and onto the backplane, where it is routed to the destination host. One multicast address may be reserved for use as a control broadcast address. Host processors may use this address to send notifications to all other blades as desired. All other control traffic may be unicasted between host processors. For security purposes, all unicast control traffic may be encrypted using DTCP before being sent. As boards are brought up in the system, DTCP sessions may be pre-established between each pair of cards for fast message transaction times. Each blade may use a private/public key pair installed uniquely for that blade at the factory.

In one or more embodiments, video traffic passed between blades in the system uses unicast addressing. In the case where full satellite transponders are being output via QAM or IP, the entire MPTS may be transmitted across the backplane to any blades that need to output the content. In this case, programs are not decrypted and are inherently secure to travel across the backplane as they are still protected by encryption, for example NagraStar™ encryption. In the cases where individual programs are decrypted by the receiver blade, a qualifying encryption scheme may always be used before transmitting the program across the backplane. The qualifying forms of encryption include Zenith's Pro:Idiom™, Samsung's LYNK™, and DTLA's DTCP-IP.

Once exception exists to the above, in which content is received from a transponder and needs to be output untouched via IP using multicast addressing. In this case, the receiver card transmits a VLAN tagged multicast IP stream directly to the backplane. The backplane switch may be pre-configured to only pass this multicast stream to the appropriate output ports. Again, these types of streams are inherently secure to travel across the backplane as they are still protected by encryption, e.g., NagraStar™ encryption.

Embodiments of the system may implement load balancing. Since each blade utilizes multiple Gigabit Ethernet links, traffic may be balanced across the different links to prevent packet loss due to the overloading of an Ethernet link. To do this, the master blade may keep track of what streams are present on which ports on each blade. Maximum bitrates may be assigned to each stream for tabulation purposes. When a new stream is required, the master blade may determine which available port is least utilized, and may then command the stream's source blade to output the content on that particular port.

In one or more embodiments, 802.1Q VLAN tagging may be used to give the master blade a direct path to the external Ethernet interface (management port). All traffic from the master host processor may be tagged with a particular VLAN ID indicating that is intended to be sent externally. That VLAN tag is stripped on egress out the external interface. All traffic into the external interface from the outside world is generally tagged on ingress with that same ID and is delivered to the master host processor with the VLAN ID left on. This allows the master host processor to use virtual Ethernet interfaces to logically isolate traffic that is intended to be kept inside the chassis from traffic intended to go outside the chassis.

Backplane data bandwidth is consumed by each blade across the backplane interface.

Assuming 1) Maximum data rate from satellite program is 15 Mbps (could also be after transcoding to MPEG-2 or H.264), 2) Maximum data rate from ATSC off-air is 20 Mbps (it is less than this but this is easier for calculations), 3) Maximum transponders is 96 and 4) Maximum average bandwidth to thin clients is 10 Mbps, then the following data rates for each card in the system are calculated to be:

| Module | Application | Bandwidth |
| --- | --- | --- |
| Satellite Receiver | Hospitality | 360 Mbps |
| | MDU | 720 Mbps |
| ATSC Receiver | Hospitality or MDU | 155 Mbps |
| QAMx | Hospitality | 3,360 Mbps |
| | MDU Q-Box | 4,320 Mbps |
| | MDU Clear QAM | 1,920 Mbps |
| NTSC Output | Hospitality or MDU | 480 Mbps |
| Media Server | MDU | 4,000 Mbps |
| Backplane | Hospitality/MDU | 9,260 Mbps |

The calculations in detail are:
Satellite Receiver
Hospitality application:
1) 3(Pro:Idiom™,Lynk™,and DTCP for Analog)×8 decrypted/encrypted programs×15 Mbps=360 Mbps
2) Program guide data=0.5 Mbps
Total=360.5 Mbps
MDU application:
1) 8 transponders×60 Mbps=480 Mbps
2) 2 (DTCP for Analog/Clear QAM or Pro:Idiom™/Lynk™/Verimatrix™)×8 decrypted/encrypted programs×15 Mbps=240 Mbps
3) Program guide data=0.5 Mbps
Total=720.5 Mbps
ATSC Receiver
Hospitality and MDU:
1) 8 ATSC channels×19.39 Mbps=155 Mbps
QAMx
QAMx hospitality:
1) 96 satellite programs×2(Pro:Idiom™,Lynk™)×15 Mbps=2880 Mbps
2) 24 off-air programs×20 Mbps=480 Mbps
Total=3360 Mbps
QAM MDU Q-Box 1) 72 transponders×60 Mbps=4,320 Mbps (limiting to 72 transponders at 60 Mbps but can be more transponders at lower data rate per transponder)

QAM MDU BulkTV
1) 96 satellite programs×15 Mbps=1440 Mbps
2) 24 off-air programs×20 Mbps=480 Mbps
Total=1,920 Mbps
NTSC Output
24×20 Mbps=480 Mbps
Media Server
400 thin clients×10 Mbps=4,000 Mbps
External Input
10 programs×15 Mbps=150 Mbps
External Output
Hospitality
1) 12 Satellite Receiver cards×240 Mbps=2,880 Mbps (or 1,440 Mbps for just Lynk™ or Pro:Idiom™)
2) 4 ATSC Receiver cards×155 Mbps=620 Mbps
Total=3,500 Mbps (or 2,060 Mbps for single Lynk™/Pro: Idiom™)

Maximum capacity allocated for external output is 3,000 Mbps and so a very fully configured system with dual Pro:Idiom™/Lynk™ encryption may be limited on the IP output as follows.

MDU
1) 12 Satellite Receiver cards×600 Mbps=7,200 Mbps
2) 4 ATSC Receiver cards×155 Mbps=620 Mbps
Total=7,820 Mbps (but limited to 3,000 Mbps by design and not likely to need anywhere close to this many programs provided over IP)

The following table lists the maximum throughput utilized in the Ethernet switch on the backplane. Note that only the inputs are listed since the outputs cannot exceed the inputs.

| Device | Count | Data Rate | Total |
| --- | --- | --- | --- |
| Satellite Receivers | 12 | 720 Mbps | 8,640 Mbps |
| ATSC Receivers | 3 | 155 Mbps | 470 Mbps |
| External Input | 1 | 150 Mbps | 150 Mbps |
| Total | | | 9,260 Mbps |

Each blade in the system may be responsible for periodically sending a status report packet to the controller or CPU in the Ethernet switch. The packet contains basic information about the blade including its uptime and current configuration version timestamp. The switch CPU then responds with a status reply packet containing some health information about the backplane including environmental and power statistics, along with the current master blade number.

When a decrypted Satellite service, QAM/8VSB service or incoming IP service that is being output is no longer available, this may be indicated to the user watching the video via a video based message. The QAM and NTSC output cards may for example detect that a service is no longer being received and output and tune to one of the error message SPTS's being output by the Master controller. The Master controller may generate up to 5 different error message streams at a MPEG-2 compressed 480i video format with blank audio in one embodiment. The target bit rate for example may be 2 Mbps. The streams may either be stored compressed or generated at initialization time.

The power supplies may contain an I2C interface to record operating conditions. Each supply in this embodiment provides bi-directional communications to the backplane host processor. Information relating to power outage, temperature, overvoltage and over current conditions are reported and logged in each supply and may be utilized by the controller to drop channels or add channels based on the amount of power available to process the given input signals. If a supply is returned for repair, the technician is able to query the power supply to better understand the nature of the failure. In addition, these statistics enable the manufacturer to understand the use case and uptimes of system.

Embodiments of the invention may include any type of environmental devices in both the power supply and the backplane that can monitor the operating conditions of the system. If conditions create a situation where the current power or temperature may cause permanent damage to the system, then protocols such as lowering the number of channels processed via a priority scheme may be utilized to preserve the health of the system while minimizing service disruption.

Figure 4B:
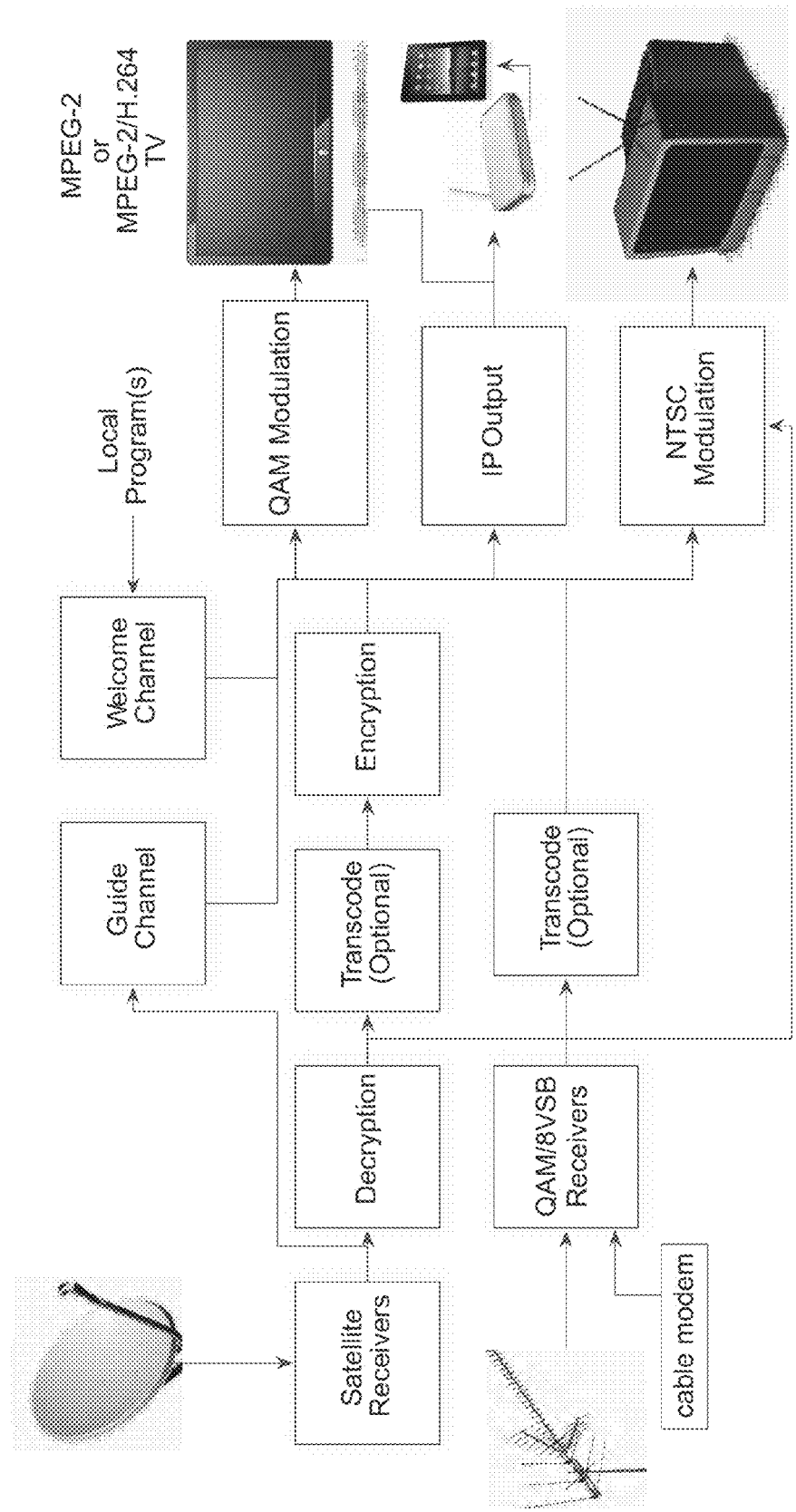

FIGS. 4A and 4B illustrate two exemplary embodiments of the invention for hospitality and MDU installations.

The MDU scenario is shown in FIG. 4A. As shown, the satellite receivers and QAM/8VSB receivers modulate satellite and ATSC signals from respective antennas. The modulated satellite signals may be decrypted and both satellite and off-air signals may be optionally transcoded as is shown with data flow from left to right in the figure for example. Any guide or local MDU content may also be received or otherwise accepted by the system and provided along with the services received to the various types of outputs shown in the right side of the figure, which are detailed further below.

Supporting an MDU with an IP system significantly simplifies the MDU business. If the MDU is pre-wired for the IP delivery system, embodiments of the invention make it possible to have the end user or subscriber install the equipment in the dwelling themselves, which to date has not been accomplished in the MDU business with respect to television. One or more embodiments of the invention may be utilized in combination with a DSL Self Install Wizard currently being used for residential installs. Thus, embodiments of the invention provide the advantage of lower Subscriber Acquisition Cost. This enables MDU residential subscribers to be profitable subscribers even with a six-month subscription life. Embodiments of the invention may be utilized in a large number of existing MDUs that for example have been previously wired with coaxial cable. In this scenario, Ethernet over Coax or EoC, greatly increases the potential number of viable IP Distribution MDU complexes.

As shown in FIG. 4A, embodiments of the invention receive all the transponders required to deliver a full programming line up to the MDU. For example, currently DISH® QAM works with an average of 52 transponders. The Multi-Program Transport Stream or MPTS is separated into multiple unique Single-Program Transport Streams or SPTS. Each SPTS carries all the necessary data for the single service to be viewed including Video, Audio, EMM/ECM, etc. Each SPTS is encapsulated as an IP multicast. The conversion process from MPTS to SPTS does not modify the NagraStar™ Conditional Access or CA used on the satellite delivered content. The advantage of one or more embodiments of the invention in this scenario is that no additional DRM license is needed for the installation in an MDU. In addition, embodiments of the invention receive the entire rich media guide data and ancillary streams that the set-top box currently receives. This data is stored in the system as set-top boxes currently store this data. The thin clients in the dwellings, for example wireless or other slave set-top boxes, for example an IP Client, would communicate with the system to obtain the guide data in the same manner in which slave set-top boxes currently communicate with the master set-top box or Media Server. This greatly reduces or entirely eliminates the amount of software development with respect to slave set-top boxes. Digital Video Recorder or DVR functionality such as PTAT, VOD, and subscriber DVR may be implemented with Network Attached Storage or NAS in each dwelling. The subscriber living in the dwelling would potentially buy the NAS as an accessory from the supplier, as is currently the case with purchasing other equipment or adapters. In one or more embodiments, if the subscriber presses the DVR button on the remote control and DVR had not already been enabled for the account, similar to programming upgrades, then in this scenario the NAS may be shipped directly to the subscriber automatically for example.

As shown with respect to MDU installations, providing television services are provided for televisions configured to receive QAM and NTSC format signals. The services may be received from both or either satellite and local off-air programming. Embodiments of the invention provide at least four output methods that may be used separately or together at a single MDU installation, which are detailed below.

1) IP streaming to a thin client set-top box or STB, e.g. IP Client. The Media Server, shown on the right middle side of FIG. 4A, provides television streams as well as the program guide information as requested by the thin client. The Media Server act similar may or may not provide DVR capability. This may be the main delivery method and is marked by heavy dark lines. The data is not decrypted from the satellite and the thin client may include NagraStar™ decryption capability. The interface from the Media Sever to the thin client as shown occurs over an Ethernet network that can include both a MOCA™ or cabling through a Cat 5/6 network.

2) QAM modulation to a Q-Box, shown in the lower right portion of FIG. 4A provides the streams directly from the satellite in a direct mapping of transponder to QAM channel. Satellite channels that have bandwidth greater than the QAM channel may be transcoded or transrated if desired. The Q-Box has NagraStar™ decryption and all satellite channels are passed directly to the Q-Box without decryption in this scenario. Program guide information is also passed on.

3) Clear QAM modulation to a television as shown in the upper right of FIG. 4A. The satellite channels are decrypted and provided through a QAM modulation to the end TV without encryption. They may be transcoded to MPEG-2 if the receiving televisions have MPEG-2 only support. The local off-air content may also be provided in this scenario. The Guide Channel may be provided as a video channel. The format for SD Clear QAM that is down converted from HD to SD is 480p at 59.94 fps. HD format may be the default format in this scenario and services originating from SD may retain their original format, although they may also be transcoded from H.264 to MPEG-2 or vice versa.

4) Analog NTSC modulation to a television as shown in the middle right portion of FIG. 4A. The satellite streams are decrypted, decoded and converted to NTSC format to be transmitted to analog televisions. Local off-air channels are also decoded and converted to NTSC.

The selection of channels for Clear QAM and NTSC may be independent of each other and also independent of what is provided to the thin client or Q-Box. In addition, embodiments of the invention enable insertion of local services (e.g. security webcam) and/or local advertisements that are provided to the system as an IP video stream. The ClearQAM and NTSC modulation capabilities provide for the insertion of advertisements into the outgoing services. The advertisements may be stored locally in the system and then played out at programmed intervals using the insertion queues in the video stream. In addition, advertisements may be provided to the thin clients, or IP Clients upon request. For example, these advertisements may be requested by the IP Clients, which are responsible for the insertion/playout to the end user. In one or more embodiments, up to, or more than 5 Gbytes of advertisements may be stored in the system with each advertisement containing roughly 12 Mbytes in size, although the size may be lower or higher. The advertisements may be obtained from satellite or from any other input into the system.

Several exemplary MDU installations are provided in the following table. The examples A through E are exemplary MDU applications and are not intended to limit the invention:

| Parameter | Details | Examples | | | | |
|---|---|---|---|---|---|---|
| | | A | B | C | D | E |
| Number of satellite transponders | 96 | 32 | 40 | 48 | 56 | 96 |
| Number of off-air services | 8 | 0 | 8 | 8 | 16 | 0 |
| Television/receiver type | 1) Thin client (IP Client) 2) Q-Box 3) MPEG-2 television 4) NTSC Television | 1, 3 | 2, 3, 4 | 1, 3, 4 | 2, 4 | 1, 3 |
| Service List (Optional) | List of services via a video service | No | Yes | Yes | Yes | Yes |
| EPG (Optional) | Program guide via a video service | No | No | No | Yes | Yes |
| Welcome service(s) (Optional) - local insertion of IP video via streamed or from local NAS | 10 | No | 1 | 2 | 2 | 2 |
| Number of Clear QAM Services | 96 | 24 | 24 | 24 | 0 | 48 |
| Number of NTSC Channels | 72 | 0 | 24 | 24 | 48 | 0 |

The following table lists the number of components utilized for the above MDU examples:

|  | A | B | C | D | E |
|---|---|---|---|---|---|
| Satellite Receivers | 32 | 40 | 48 | 56 | 96 |
| ATSC Receivers | 0 | 8 | 8 | 16 | 0 |
| Decryption | 24 | 24 | 24 | 48 | 48 |
| Transcode | 24 | 24 | 24 | 48 | 48 |
| QAM Channels - Annex A | 0 | 40 | 0 | 56 | 0 |
| QAM Channels - Annex B | 12 | 12 | 12 | 0 | 24 |
| IP Output Bandwidth | 4.0 Gbps | 0 | 4.0 Gbps | 0 | 4.0 Gbps |
| IP Input Bandwidth | None | 5 Mbps | 10 Mbps | 10 Mbps | 10 Mbps |
| Analog NTSC Channels | 0 | 24 | 24 | 48 | 0 |

The component numbers are based on the following assumptions:
 1) The number of QAM Annex B Channels is based upon:
  a. Two ATSC channels per QAM channel
  b. Clear QAM HD channels per QAM is 2
 2) The number of QAM Annex A channels currently assumes that there is a one to one mapping from transponder to QAM.
 3) The IP Output Bandwidth is based upon 400 thin clients each receiving 10 Mbps video.
 4) The IP Input Bandwidth is based upon 5 Mbps for each input channel.

The hospitality scenario is shown in FIG. 4B. As shown, the satellite receivers and QAM/8VSB receivers modulate satellite, cable modem and ATSC signals from respective antennas or sources. The modulated satellite signals may be decrypted and both satellite and off-air signals may be optionally transcoded as is shown with data flow from left to right in the figure for example. The satellite signals may be re-encrypted before being output to maintain security. Any guide or Welcome Channel content may also be received or otherwise accepted by the system and provided along with the services received to the various types of outputs shown in the right side of the figure, which are detailed further below.

In hospitality or B2B environment including FTG (Free to Guest) installations, the system receives the satellite A/V signals and converts them into a format that can be sent over the desired network. In hotels for example, the services are typically distributed through the hotel property using QAM RF modulation. Some properties may also use UDP/IP as the protocol and transmit over an Ethernet based network for example. In one or more scenarios, video streams may be modified so that the maximum bit rate does not exceed the network capacity. In addition, since the type of client device that is deployed may not be compatible with the Audio or Video signals being transmitted over the satellite network, the system may transcode and/or transrate the video and audio signals to service the complete market place. Embodiments may also stream some channels to a wireless network that feed wireless devices, such as tablet computers, for example in a hotel lobby or workout area. Embodiments may also provide output for analog NTSC based televisions.

Soon, it is expected that in Hospitality environments that there will be no need for a set-top box with the arrival of commercial Smart TV's. Manufacturers are expected to deliver Smart TV's into the commercial market in short order. There are already a number of system integrators converting their solutions from STB based to Smart TV based solutions. The combination of one or more embodiments of the invention and Smart TV's will expand the IP delivery customer base to segments of the hospitality market that previously were excluded due to the cost.

This scenario provides services for digital televisions that are capable of:
 1) MPEG-2 only or MPEG-2/H.264 (a property may include a mix of these TVs)
 2) Either Pro:Idiom™ or Lynk™ encryption
 3) High Definition or HD format
 4) Audio encoding format supplied by satellite and off-air using Dolby Digital AC3 and MPEG1 Layer2
 5) Support H.264 for IP input Several exemplary hospitality installations are provided in the following table. The examples A through E are exemplary hospitality applications and are not intended to limit the invention:

|  |  |  | Examples | | | | |
|---|---|---|---|---|---|---|---|
| # | Parameter | Details | A | B | C | D | E |
| 1 | Number of satellite services | 96 | 32 | 40 | 48 | 56 | 80 |
| 2 | Number of off-air services | 8 | 0 | 8 | 8 | 0 | 8 |
| 3 | Encryption type | 1) Pro:Idiom ™<br>2) Lynk ™<br>3) Pro:Idiom ™ and Lynk ™ | P | L | P & L | P | P & L |
| 4 | Infrastructure | 1) RF over cable<br>2) Ethernet (includes RF based Ethernet e.g. Moca)<br>3) RF over cable and Ethernet | RF | RF | Eth. | Eth. & RF | Eth & RF |
| 5 | Television Input | 1) QAM<br>2) IP<br>3) Analog | QAM | QAM | IP | QAM<br>IP | QAM<br>IP |

-continued

| # | Parameter | Details | Examples | | | | |
|---|---|---|---|---|---|---|---|
| | | | A | B | C | D | E |
| 6 | Television Decode type | 1) MPEG-2/H.264<br>2) MPEG-2<br>3) NTSC | MP2/<br>H.264 | MP2<br>NTSC | MP2/<br>H.264 | MP2/<br>H.264 | MP2,<br>MP2/<br>H.264,<br>NTSC |
| 7 | Service List (Optional) | List of services via a video service | No | Yes | Yes | Yes | Yes |
| 8 | EPG (Optional) | List of programs via a video service | No | No | No | Yes | Yes |
| 9 | Welcome services(s) (Optional) - local insertion of IP video via streamed or from local NAS. | 10 | No | 1 | 2 | 2 | 2 |
| 10 | Analog NTSC Channels | 72 | 0 | 24 | 0 | 0 | 48 |

The following table lists the number of components utilized for the above hospitality examples:

| | A | B | C | D | E |
|---|---|---|---|---|---|
| Satellite Receivers | 32 | 40 | 48 | 56 | 80 |
| ATSC Receivers | 0 | 8 | 8 | 0 | 8 |
| Decryption | 32 | 40 | 48 | 56 | 80 |
| Transcode | 0 | 40 | 0 | 0 | 80 |
| Encryption | 32 | 40 | 48 | 56 | 80 |
| QAM Channels | 11 | 25 | 0 | 20 | 32 |
| IP Output Bandwidth | None | None | 652 Mbps | 580 Mbps | 932 Mbps |
| IP Input Bandwidth | None | 5 Mbps | 10 Mbps | 10 Mbps | 10 Mbps |
| Analog NTSC Channels | 0 | 24 | 0 | 0 | 48 |

The component numbers are based on the following assumptions:

1) The output bandwidth assumes the welcome and guide channels use 20 Mbps

2) The number of H.264 HD channels per QAM is 3 and the number of MPEG-2 HD channels per QAM is 2.

3) The number of satellite receivers assumes that each of the channels may be on a different transponder.

FIG. 5 illustrates an architectural diagram of the radio frequency switch. As shown, the satellite inputs on the chassis receive multiple satellite LNB signals each having multiple transponder streams, e.g., 24 transponders per LNB. The RF switch distributes the satellite RF input signals to desired satellite receiver cards for demodulation. This embodiment of the invention utilizes four satellite inputs on the front of chassis, each of which receives signals from a respective LNB and at a frequency range from 950 to 2150 MHz. Since the system does not have to command the LNB's or communicate to them, the switching and selection of services may occur in a more robust manner since card failures may be accounted for by re-routing channels to a functioning receiver card for example. As shown, the LNB inputs may be selected in any number, for example 12 ways by the 1:12 splitter shown coupled with the amplifiers on the left side of the figure. The amplifiers may any value or type of gain desired for the particular application. In one or more embodiments, each output of the amplifiers may include or couple with a power detector and A/D converter for example to enable an installer to visually determine in rapid order whether or not a satellite input has sufficient power. This capability is unknown in the art for a single chassis MDU solution. In this exemplary implementation, there are 12 channel stacker switches that couple with satellite capable slots (1-12). Each of the 12 channel stacker switches may be configured to select any 8 transponders from the four LNB input signals to enable selection of a total of 96 different transponders. These eight transponder signals are then combined into a single RF signal and placed on the connector to the RF capable slot, for example having 8 set frequency ranges so that each satellite receiver receives a known set range of frequencies regardless of the original transponder frequencies. Each transponder for example may provide multiple services, e.g., ESPN®, CNN®, etc., that are eventually mapped to a particular channel for viewing on a television for example. The multi-switch block shown in the right side of the figure may utilize 3 channel stacking switch (CSS) chips, (RFM5218 and RFM5219), which combined selects eight different portions of the spectrum from anywhere on the four input signals. In one or more embodiments, the control of the multi-switch is accomplished using I2C signals from the backplane controller. The controller for example may act as a dumb remote control I2C device for the receiver cards. The master controller may send I2C messages via IP that are passed on to the CSS chips. This allows the back plane host processor to be implemented in a minimally complex manner. Gain and other signal information may be returned to the master controller for status. In addition, when RF slots are unallocated the RF output may be disabled to conserve power and limit noise floor contribution. Embodiments of the invention employing this single wire architecture eliminate the need to terminate unconnected ports.

Figure 6:
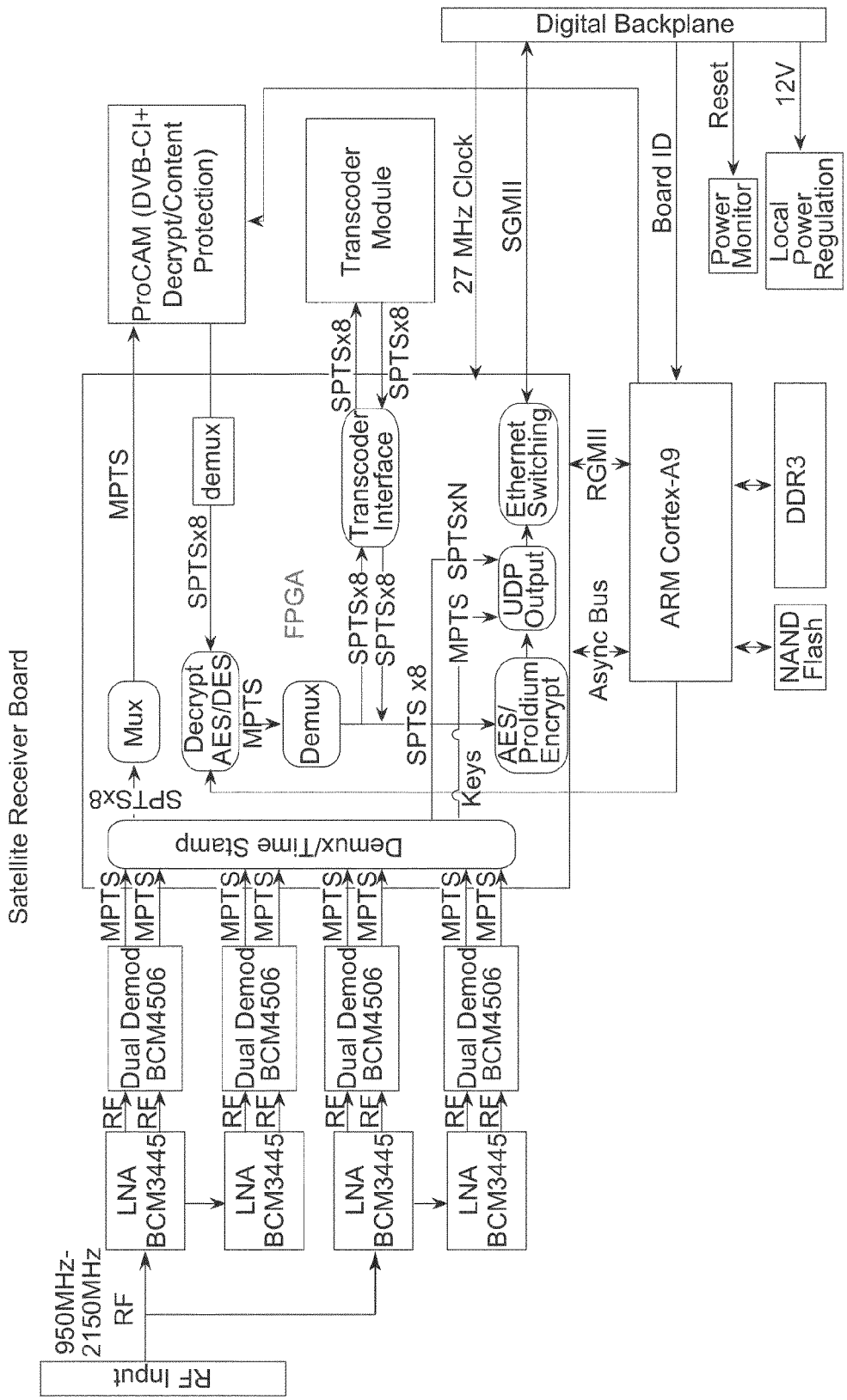
FIG. 6 illustrates an architectural diagram of the satellite receiver card or blade.

FIG. 6 illustrates an architectural diagram of the satellite receiver card or blade. FIG. 6A illustrates the satellite receiver card or blade also with octal demod capabilities. The receiver cards are responsible for receiving the L-Band modulated carriers from the RF backplane. The receiver cards as shown in the left side of the figure have a four dual LNAs as all the carriers are stacked by the backplane CSS. Although the receiver cards are shown as cascaded, they may also be coupled with a splitter as one skilled in the art will recognize. Each dual demodulator recovers the digital DVB packets and outputs them on a TS interface to the FPGA for processing and finally transmitting to the rest of the system. Depending on the mode of operation the receiver supports various data flow paths as follows:

AnalogTV/ClearQAM

In these modes the receiver card receives up to 8 programs from the various carriers and remove the NagraStar™ encryption. The signals are then encrypted using DTCP (AES128). This occurs in the FPGA so no signals are exposed with data that is in the clear. If any of the eight programs need to be converted to a different format or transcoded/trans-rated they are sent to the Transcoder module installed onto the receiver card. After transcoding the signals are transferred to the various output blades in DTCP encrypted format.

BulkTV—Pro:Idiom™ and Lynk™

In these modes the receiver card receives up to 8 programs from the various carriers and removes the NagraStar™ encryption. The signals are then encrypted using DTCP (AES128). This occurs in the FPGA so no signals are exposed with data that is in the clear. If any of the eight programs need to be converted to a different format or transcoded/trans-rated they are sent to the Transcoder module installed onto the receiver card. After transcoding the signals are decrypted (DTCP removed) and re-encrypted using Pro:Idiom™ and/or Lynk™. In one or more embodiments, both are allowed on each program. The encrypted signals are transferred to the various output blades in encrypted format.

MDU—IP and QAM

In these modes the receiver card receives up to 8 transponders from the various carriers. In this mode the NagraStar™ Encryption is not removed. The various Programs are sent via IP to either the QAMx card or the Media Server card.

Host Server

Each receiver card can act as a master controller for the system. The system is inherently fully redundant from a host controller point of view since any card is capable of acting as master. As the unit is powered on, the intelligent backplane assigns the duties of the Master to one of the receiver cards. Once that receiver assumes the responsibility all UI and other control traffic is routed to it. If a failure occurs in that receiver card, the intelligent backplane assigns the duties of master to another card.

NagraStar™ Decryption—ProCAM Device

The SmarCam-3.5 Pro from SmarDTV (ProCAM) may be used to provide the NagraStar™ decryption. The interface to the module is the standardized DVB-CI that is implemented with the FPGA. The ProCAM module decrypts up to 8 programs simultaneously. These programs are provided as a single MPTS and so the FPGA multiplexes the required SPTS programs from the various transponder inputs into a single MPTS. The ProCAM decrypts and sends back to the FPGA which demultiplexes the programs back into SPTS. The current ProCAM module is only DVB-CI and so the streams are provided in the clear back from the ProCam module. DVB-CI+ implements encryption on the return interface. The ARM control processor communicates with the ProCAM module for the setup and control of the decryption. In addition, the ProCAM module stores the enabling features of the card which is at least the number of channels of Pro:Idiom™ and Lynk™ encryption.

Encryption Modes—The receiver card supports several encryption modes as follows:

DTCP (DTLA Licensed)

The FPGA is capable of both encrypting and decrypting DTCP packets. As data is decrypted using the PROCAM it is immediately (within the FPGA) encrypted using DTCP. Once it is encrypted it may then be transmitted to the back plane for other cards to consume the payload. In addition a transcoder module may also utilize the DTCP'd data for its own consumption.

Pro:Idiom™ (LG/Zenith Licensed)

The FPGA may encrypt using LG®'s Pro:Idiom™. As data is decrypted using the PROCAM™ it is immediately (within the FPGA) encrypted using DTCP. If needed the DTCP traffic is passed to the transcoder module for format conversion. The transcoder module returns the re-formatted data using the same DTCP keys. At this point the FPGA can decrypt the DTCP and re-encrypt using Pro:Idiom™.

Lynk™ (Samsung Licensed)

The FPGA is capable of encrypting Samsung's Lynk™. As data is decrypted using the PROCAM™ it is immediately (within the FPGA) encrypted using DTCP. If needed the DTCP traffic is passed to the transcoder module for format conversion. The transcoder module returns the re-formatted data using the same DTCP keys. At this point the FPGA can decrypt the DTCP and re-encrypt using Lynk™.

Verimatrix™

The FPGA may also encrypt using the Verimatrix™ Video Content Authority System (VCAS) which enables secure delivery over multiple networks to a diverse array of consumer devices, such as mobile devices and televisions.

Multiple Encryption Modes

In the case of Hospitality, both Pro:Idiom™ and Lynk™ technologies may be deployed. Because of the common architecture of converting to DTCP, the FPGA may deploy both the Pro:Idiom™ and Lynk™ packets together from the same receiver card. For example, 8 streams at 15 Mbps=120 Mbps×2 formats yields 240 Mbps (well under the GigE interface capability). In a more extreme case the system can support both MDU and hospitality modes, 60 Mbps/transponder×8+240 mbps=720 Mbps.

FIG. 7 illustrates an architectural diagram of the off-air or ATSC receiver card or blade. The ATSC Receiver blade enables reception of 8 ATSC channels using 8 independent tuner/demod chains shown in the left portion of the figure. Similar to the Satellite Receiver blade, the ATSC Receiver blade also supports a transcoder module allowing ATSC MPEG2 video streams to be transcoded to MPEG4 or rate adjusted as desired and described below:

Tuner and RF Chain

An external ATSC antenna is generally connected to a 75 ohm F-connector located at the front of the ATSC Receiver blade. The antenna input is actively split 8 ways and fed into each of the 8 tuners.

Demodulator

The advanced demodulator in the ATSC Receiver blade supports several features to improve demodulation consistency, even with weak input signals. The demodulator employs AGC, timing recovery, carrier recovery, adaptive equalization, phase tracking, and forward error correction (FEC) in one or more embodiments.

Data Flow

Each demodulator outputs serial transport stream to the FPGA on the card. The FPGA then demultiplexes the various programs in the transport stream into independent SPTSs in order for them to be flexibly handled by the rest of the system. Once demultiplexed, any programs that need to be transcoded to H.264 or transrated are sent to the optional transcoder module (if present) for transcoding. Once programs are returned from the transcoder module they are sent across the backplane to any output blades configured with those specific programs.

Program Guide Generation

The QAM/8VSB Receiver blade is capable of generating a scrolling program guide using the guide data available to it. The program guide may be encoded as either H.264 or MPEG2, and can be either HD or SD. The generated guide is streamed to the Gigabit backplane to be output via QAM, IP, or NTSC.

Host Server

Each receiver card may act as a Master controller for the system. The system is inherently fully redundant from a host controller point of view when any card may take over master controller responsibilities. As the unit is powered on, the intelligent backplane assigns the duties of the Master to one of the receiver cards, whether satellite receiver or QAM/8VSB receiver. Once that receiver assumes the responsibility the UI and other control traffic is routed to it. If a failure occurs in that receiver card, the intelligent backplane selects another card to be the master.

Functional Description

The QAM/8VSB Receiver blade supports an auto scan feature where any unused tuners on the blade are used to scan through all VHF and UHF channels. Detected channels are demodulated and parsed to fill in a program list for that particular channel. The results of the scan may then be presented to the user for configuration. The receiver blade may receive up to a maximum of 155.12 Mbps, which is full utilization of all 8 ATSC channels (8*19.39 Mbps). Hardware on the receiver blade may for example support ATSC A/53 8/16-VSB.

Figure 8:
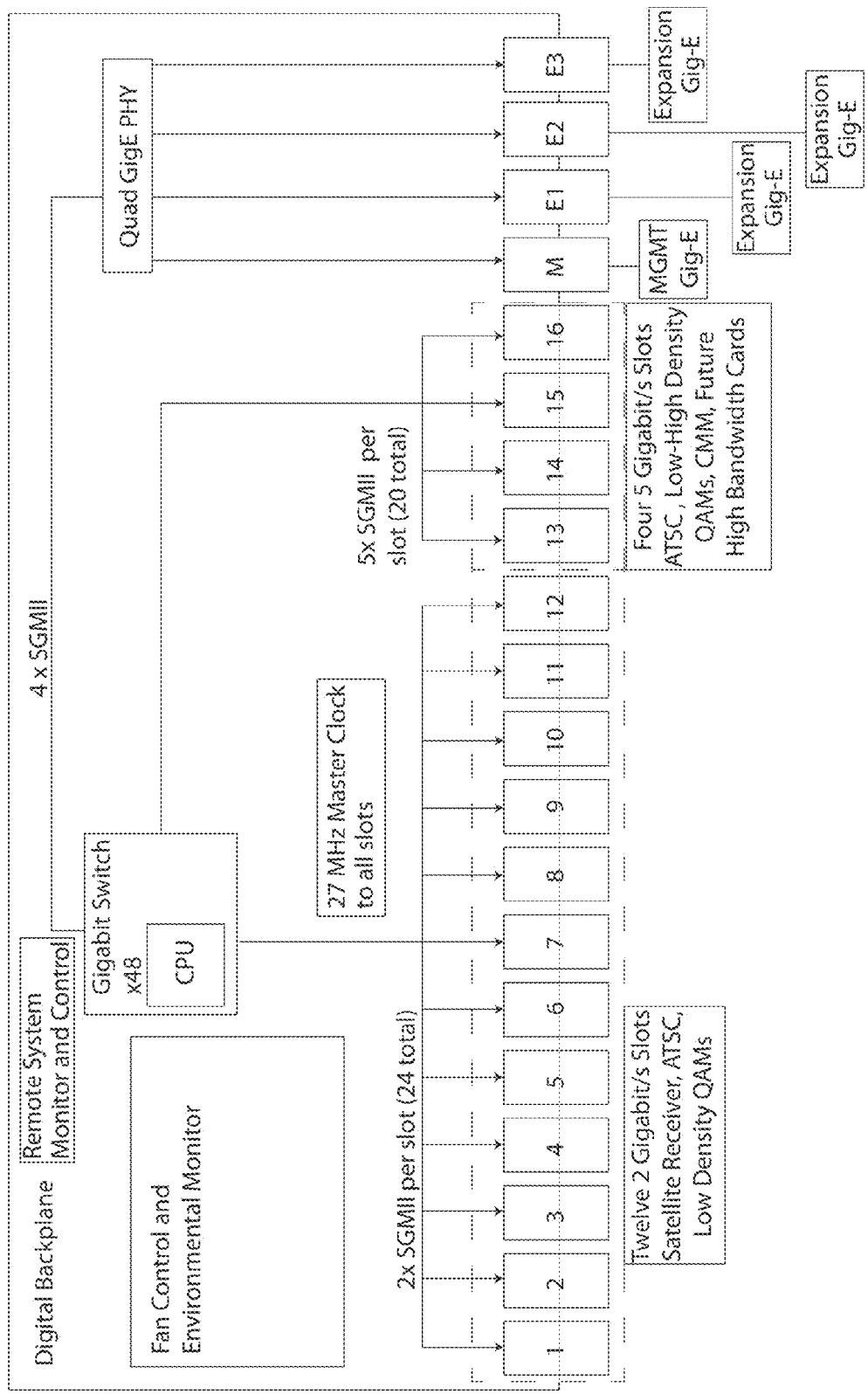
FIG. 8 illustrates an architectural diagram of the Internet Protocol backplane.

FIG. 8 illustrates an architectural diagram of the Internet Protocol backplane. The digital backplane may be implemented with a 48 port Gigabit Switch (BCM53718), that has a capacity to switch 20 Gbps and which may be used to switch both the data and control signals in the system. The digital backplane may utilize standard Ethernet switching technology to connect to both the cards and the external management port and expansion ports. Embodiments may utilize any number of slots and as shown in the examples herein, there are 12 standard slots each of which have two Ethernet connections giving a total of 2 Gbps data transfer between these cards and the backplane. Embodiments may also employ any number of high-speed slots, for example four high-speed slots each of which have five Ethernet connections giving a total of 5 Gbps connectivity for higher bandwidth requirements.

The digital backplane provides:
1. Ethernet switch control and configuration
2. System monitoring and setting of the master The backplane CPU, shown within the Gigabit Switch in the upper center portion of the figure may be implemented with an integrated MIPS processor for management functions with a DDR memory controller, a CMIC for switch access, parallel flash interface for booting, two serial UART interfaces, and eight GPIO pins. The CPU within the switch chip may include the following functionality:
1. Assigning which card is the master controller
2. Temperature monitoring
3. Failure detection of the master
4. Traffic management of Multicast/VLAN data packets, adding MAC addresses/VLANs to the routing table within the switch
5. Static configuration of the router table in the Ethernet switch for fixed internal MAC addresses communication
6. The learning and adding of external MAC addresses With respect to Ethernet Switching, the main functionality of the digital backplane is to switch Ethernet packets to and from the slots and the management port. Embodiments may utilize standard layer 2 Ethernet switching with the addition of VLAN tagging. For example video streams may use VLAN tagged multicast IP packets to allow efficient management of traffic and the duplication of data to more than one slot without flooding the system. Admittance to a VLAN is controlled by the master sending a notification to the backplane CPU.

With respect to MAC Address Management, the digital backplane may utilize a combination of fixed internal MAC addresses based on card slots and unique MAC addresses for external communication. This addressing scheme provides the following features:
1. The master controller is assigned a second unique MAC address assigned to the chasse. The master may be moved to another card and this MAC address then moves to the new master. This is used for external communications for the management interface.
2. Each card with a host controller may utilize a fixed MAC address based on the slot the card is in. This may be utilized for bi-directional communications internal to the unit.
3. Video traffic, multicast and unicast streams may use the master MAC address for their source MAC address. This allows the multicast streams to be routed externally.
4. Streams generated within FPGA's may either have a destination MAC address in the multicast range or an external MAC address.

With respect to IP Address Management, IP addresses for the internal card may use a fixed scheme based on the card slots. An external IP address interface may be given for the management port, which can be either a fixed IP address or use DHCP. The backplane and each host on a card in a slot may utilize fixed IP addresses. The master controller may utilize a second IP address for external communications.

The backplane CPU controls the reset lines for the cards in the slots. The control lines are managed as follows:
1. On boot the backplane CPU checks the power configuration and brings the cards out of reset.
2. On instruction from the master the backplane resets individual cards.
3. On detection of a failed master (master watchdog time out) the backplane CPU places and keeps the current master in reset and makes another card the master. An error may be logged for the new master to perform an action.

With respect to bandwidth usage, as this is generally more than one connection to each card, intelligent usage of the bandwidth is performed as follows:
1. For the data originating in a card, that card is responsible for the Ethernet port that it utilizes to send the data on.
2. For data travelling from the switch to the card, the master controller is responsible for managing the bandwidth usage. At the time when a new stream is added, the master controller makes a decision as to which port should be added to the stream and sends a message to the backplane CPU to configure the switch appropriately.
3. Streams are generally not split across Ethernet channels as this creates timing issues.

Figure 9:
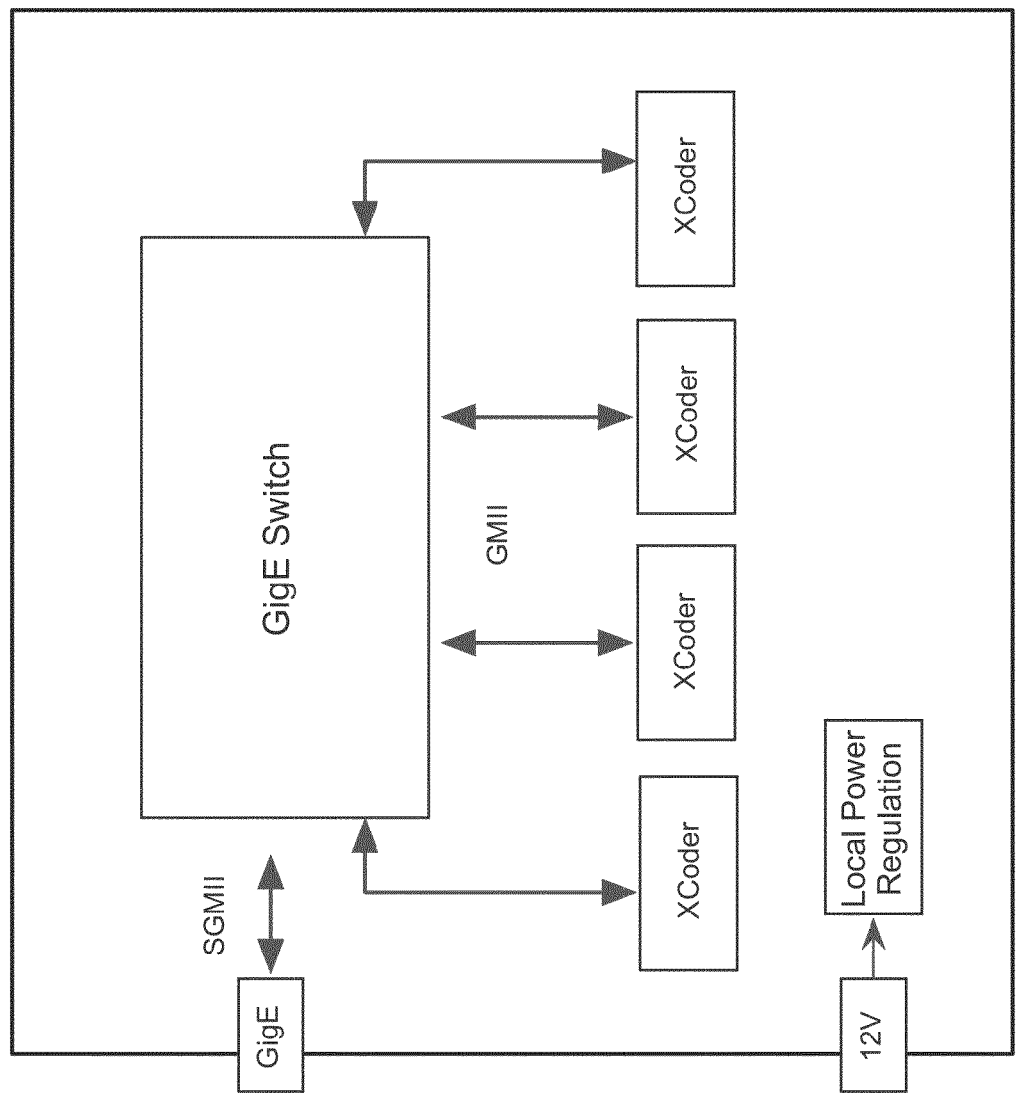
FIG. 9 illustrates an architectural diagram of the transcoder sub-module.

FIG. 9 illustrates an architectural diagram of the transcoder sub-module. The transcoder module may optionally be installed on the Satellite and ATSC receiver cards. The main function of this module is to convert H.264 signals received from the satellite to MPEG-2 format. In addition, this module may be installed on the ATSC card to convert the MPEG2 off air signals to H.264. In one embodiment, the transcoder shown in the figure as XCoder may be implemented with a ViXS XCode Pro200 processor. As shown, the four dual transcoders are interfaced to the host board (Satellite or ATSC) via a GigE ports. This GigE interface may be encrypted DTCP (AES128) in both directions. The XCoder is configured to encrypt and decrypt the streams that are transcoded. This module may be implemented as a daughter module plugin for both the Satellite and ATSC receiver cards.

Figure 10:
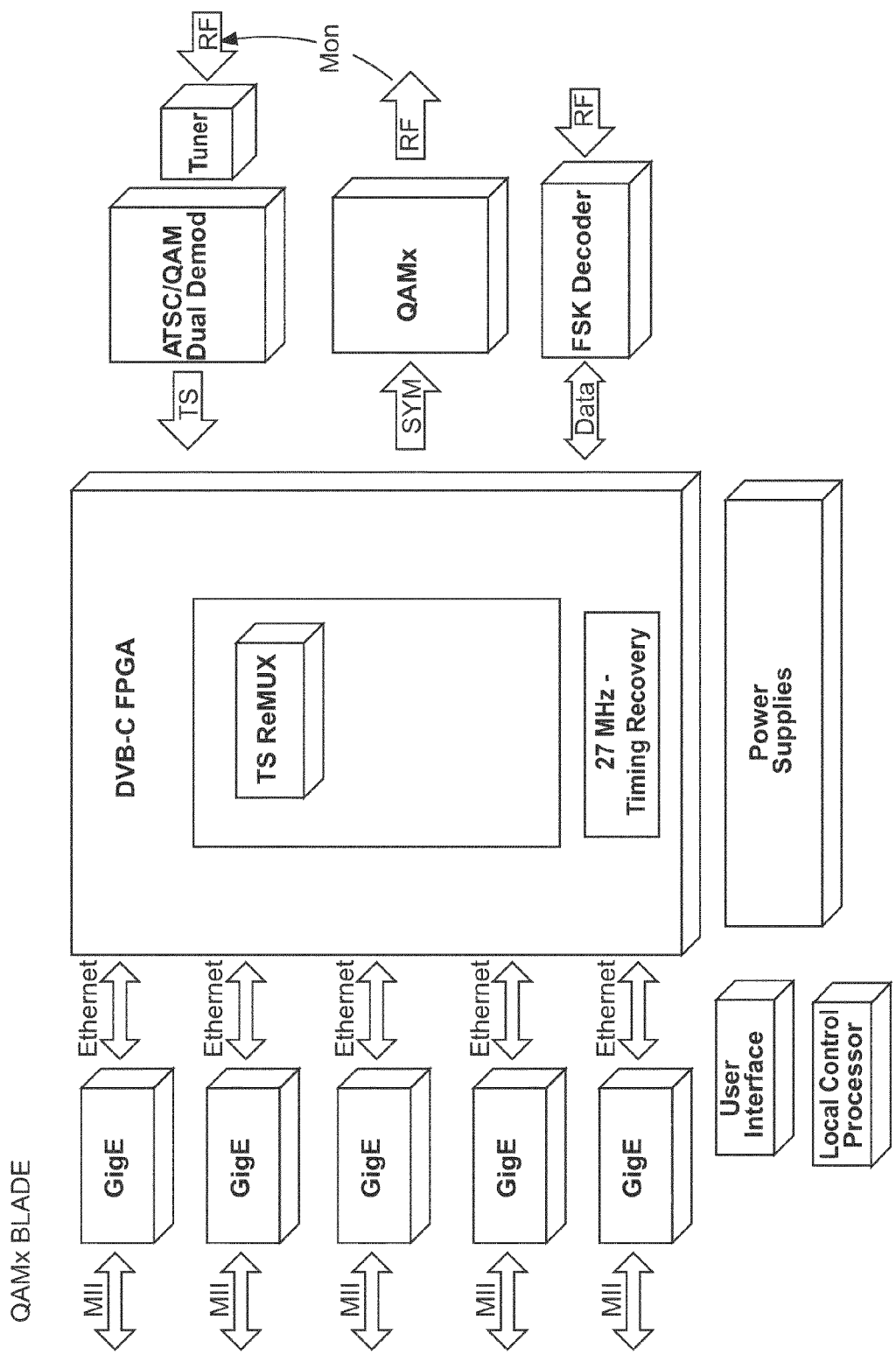
Figure 10A:
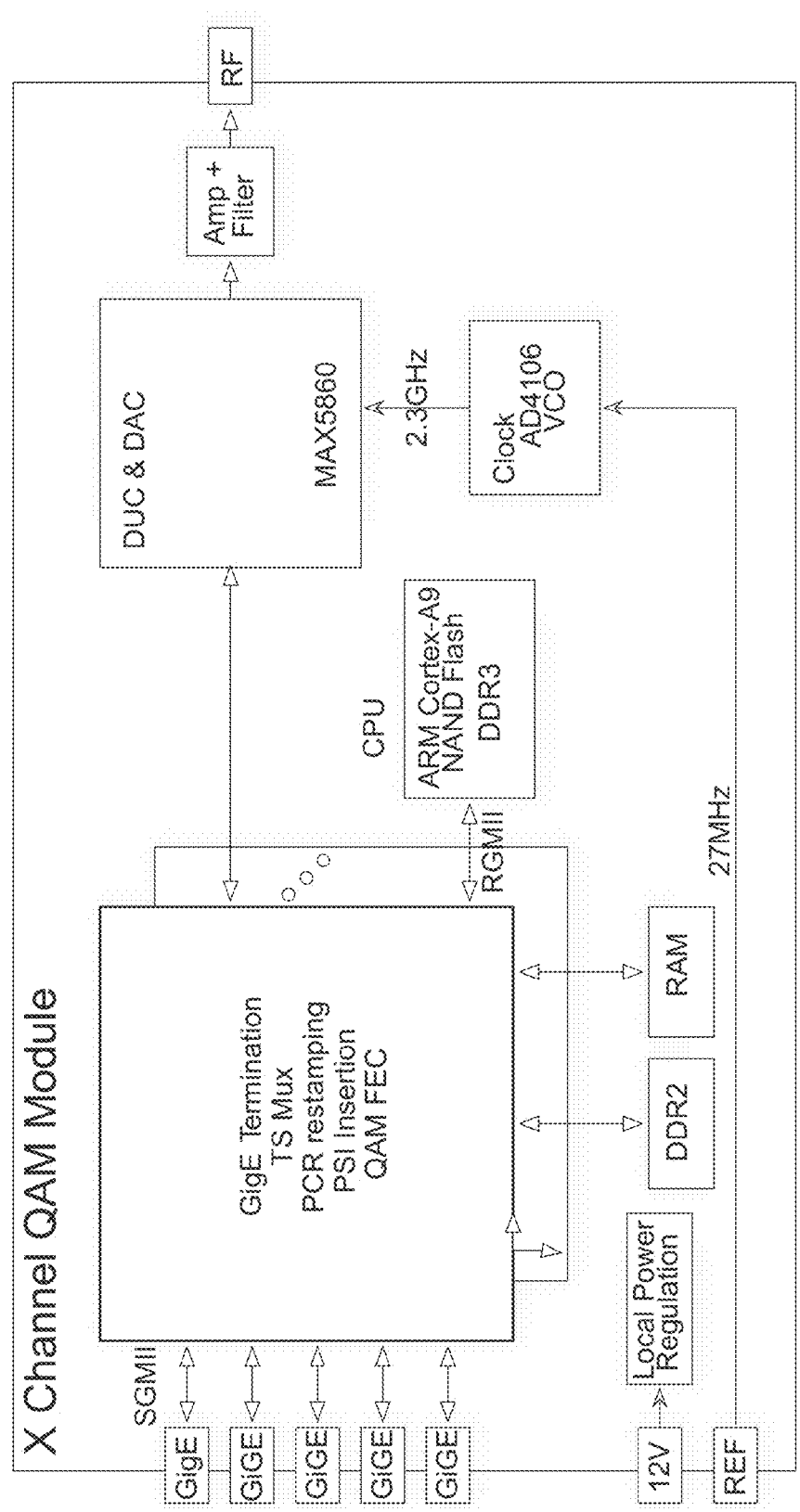
FIG. 10A illustrates another embodiment thereof.

FIG. 10 illustrates an architectural diagram of the QAM modulator card or blade, while FIG. 10A illustrates a specific implementation thereof. The QAMx blade is a card that provides a high a density QAM carrier output. The blade plugs into the chassis and in one or more embodiments outputs up to 48 or 96 QAM channels using the input streams as provided by the receiver cards and external IP input. The QAMx module combines the SPTS into MPTS for output on the QAM channels. The RF output is on the front of the card in one or more embodiments. The output mode of the card is either Annex A, Annex B or Annex C but is not a mix of modes. In one or more embodiments, one or more of the QAMx outputs may be monitored, i.e., wrapped back into the system as an ad hoc spectrum analyzer as is shown by the arrow labeled "Mon" back into the ATSC/QAM demodulator. This enables a quick view as to the power on particular channels so that the system may be debugged in an integrated and rapid manner, which is unknown in the industry. In addition, the FSK decoder enables legacy televisions having a unique code to request movies from the system using Frequency Shift Keying messages that enter the system at the FSK decoder.

The main functions of the QAMx blade are to process IP traffic that arrives from the backplane interface, multiplex, de jitter and recover PCRs, and apply the relevant QAM FEC prior to Digital Up Conversion to RF. Due to the large range of channel counts this card supports, and to optimize the costs for the various use cases it may be configured with either one or two FPGA devices, e.g., one for QAMx48, two for QAMx96. The QAMx48 for example may range from 16 to 48 QAMs in increments of 8, the QAMx96 may range from 16 to 96 QAMs in steps of 8 QAMs. The QAMx blade may be implemented with a Cyclone V FPGA with 300KLE (a second FPGA may be installed for the QAMx96 SKU). The FPGA(s) is configured to receive the IP traffic and recover the individual transport streams, and provide FEC encoding for QAM transmission. Digital Up conversion and RF output is achieved in one or more embodiment using a Maxim MAX5860. Each of the QAMx may also be equipped with a Freescale Cortex-A9 CPU for example which may also be used in the receiver blades.

QAMx Data Flow

The QAMx device receives both control and video data via up to five backplane Gigabit Ethernet ports in one or more embodiments although any number of Gigabit ports or other high speed ports may be implemented depending on the system requirements. Five port configurations enable the QAMx to operate at maximum performance of 96 QAM channels or (96×40 Mbit/s). Typically each service is received on a unique IP:PORT pair, and the TS is extracted from the UDP payload. Each service is buffered through its own FIFO, to allow the FPGA to recover the PCR and rate information from the TS, prior to re-multiplexing. Multiple services are combined into each Multiple Program Transport Streams, (one MPTS per QAM channel). Following MPTS assembly, including PSI insertion, each MPTS is passed through a QAM FEC block. The QAM FEC blocks may be of a quad channel design, where the 4 channels share a common QAM constellation and symbol rate. The QAMx48 may utilize 12 of these blocks, while the QAMx96 may utilize 24 for exemplary purposes. The FEC's pass baseband FEC encoded data to the DUC/ DAC device, where it is up converted and filtered and optionally pre-distorted. The DAC output may contain channels in the range from 45 to 1003 MHz in one or more embodiments. The combined FPGA & Maxim DUC/DAC implementation includes the following features.

1) Outputs up to four 192 Mhz blocks, each block is frequency agile within 950 Mhz.
2) Each 192 Mhz block is made up of four 48 Mhz blocks,
3) Each 48 Mhz block may contain up to 8 QAM carriers.
4) Within a 48 Mhz block, the QAM center frequency for each carrier is independently controlled.
5) Within a 48 Mhz block, the symbol rate for each carrier is independently controlled.
6) Support of up to of 96 QAM channels.

The QAMx may map any input program into any QAM output carrier. The QAMx may generate the associated DVB tables allowing a consumer DVB-C television or STB receive and correctly interpret the signals. In the case of QBOX, entire MPTS is passed onto a QAM channel without modification. One program from within each MPTS is used to drive the RATE information for reconstructing the MPTS timing in one or more embodiments.

FIG. 11 illustrates an architectural diagram of the Media modulator card or blade. The Media Server is a card that plugs into the chassis and provides rich guide content and programs to a thin client through an IP based network. The guide content may be received from the Satellite Receiver and the output programs may be received from the Satellite, ATSC receivers and IP input for local content. The Media Server supports up to 400 clients and has 5 GigE ports on the front of the card in one or more embodiments assuming a typical maximum level of processing and bandwidth requirements per client.

The Media Server blade acts primarily as a server to configure and serve content to downstream IP Client receivers. The blade enables a high performance computer System-on-Module (SoM) to be installed to support any required IP Client functionality beyond the capabilities of the host processor. The blade also enables streaming out IP content on its 5 Gigabit output ports located on the front of the blade.

System-on-Module Interface

The SoM interface for the media server card may be implemented with a COM Express. This interface provides all peripheral interfaces including SATA, USB, Gigabit Ethernet, and PCI Express. By using a defined interface like COM Express, the system also provides the ability to select from a wide range of SoMs with varying computational capabilities. Additionally, the modules are provided from several different vendors all conforming to the same specification.

System-on-Module Storage

The SoM boots and run off of an mSATA drive on the blade in one or more embodiments. The mSATA drive provides a convenient form factor, excellent robustness, fast transfer speeds, and room for expansion if more storage is needed at a later date.

System-on-Module Selection

The COM Express form factor allows use of any SoM ranging from a single-core Intel Atom E640 clocked at 1.0 GHz, all the way up to an Intel Core i7 clocked at 2.0 GHz and above. COM Express modules typically have an on board SO-DIMM slot for memory to be added as desired. Using a common form factor of memory such as SO-DIMM allows costs to be minimized.

Host Processor Vs System-on-Module

The Media Server blade may utilize a higher performance host processor than the rest of the blades and may also be equipped with more memory and more storage. The host processor may be implemented with a Freescale i.MX6 quad core ARM Cortex-A9 clocked at 1.2 GHz (compared to the single core version equipped on the other blades). With the additional CPU power, memory, and storage available, the Media Server blade may meet all the required functionality for IP Client control without even installing a System-on-Module, but the blade may include expansion capability in case more processing is desired at a later date.

Media Server Capabilities

The Media Server blade may be configured to run standard software components such as a SQL server and a web server/service. The blade may also support SSL encrypted connections to the IP Clients.

USB 2.0 Interface

The Media Server blade may be equipped with a USB 2.0 port on the front panel to allow an external hard drive or flash drive to be attached and mounted by either the SoM or the host processor. The Media Server generally supports streaming transport stream files available on the drive out either the front Gigabit Ethernet ports or to the Gigabit backplane to be output via QAM or NTSC.

Network Attached Storage Capabilities

The Media Server blade also supports the ability to connect to a remote network attached storage device. Supported network file system protocols may include SMB and NFS or any other file system protocol. The Media Server generally supports streaming transport stream files available on the networked storage device out either the front Gigabit Ethernet ports or to the Gigabit backplane to be output via QAM or NTSC.

Figure 12:
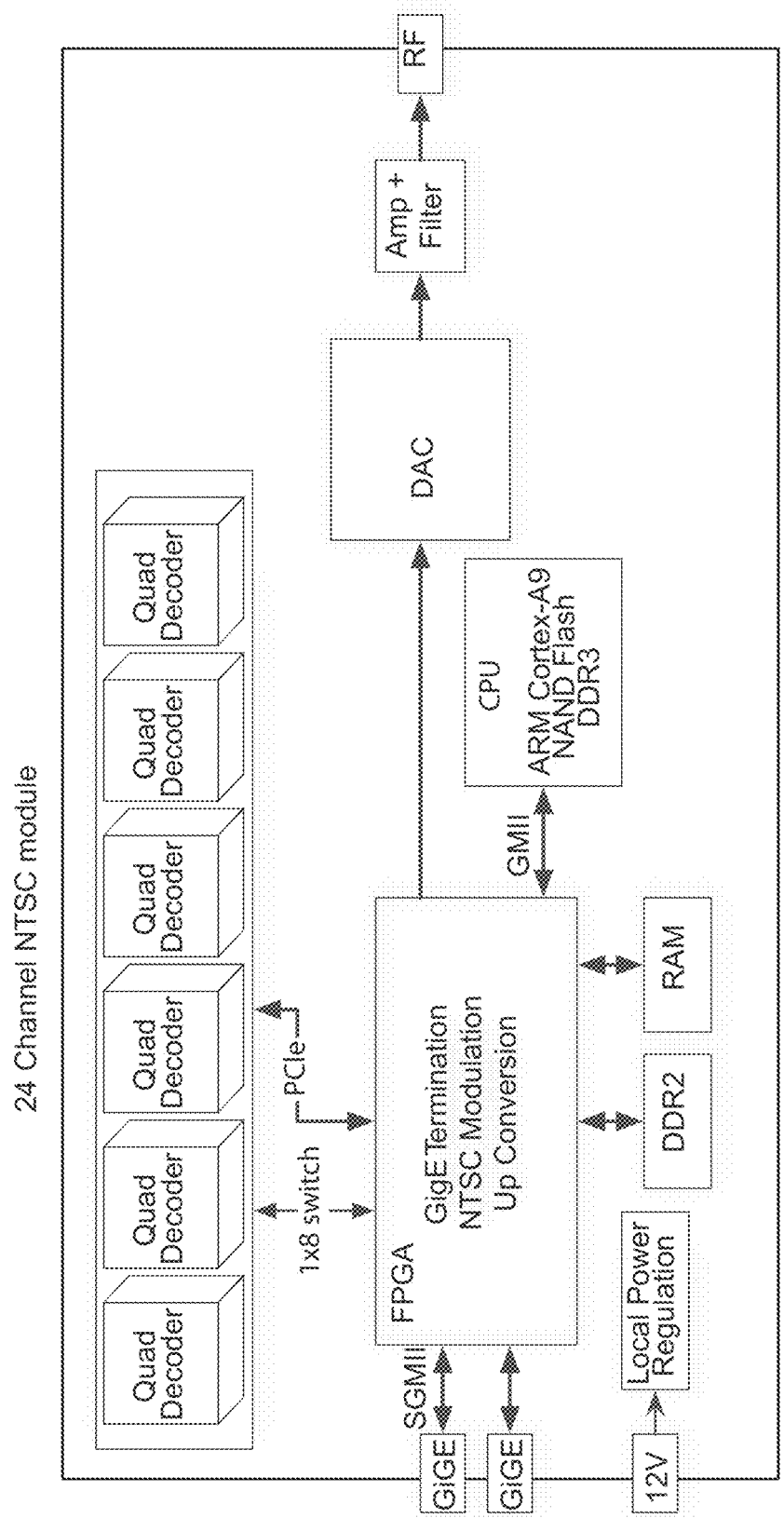
FIG. 12 illustrates a specific implementation of an NTSC modulator card or blade.

FIG. 12 illustrates a specific implementation of an NTSC modulator card or blade. The NTSC blade plugs into the chassis and provides up to 24 channels of NTSC modulated programs, which it receives as SPTS streams from the Satellite and ATSC receiver modules as well as local IP input. The output from the NTSC module is on the front of the card in one or more embodiments. This card is provided to maintain legacy compatibility. It may be used in installations having an analog tier of service. The card outputs a continuous block of 6 Mhz NTSC channels as an agile 144 Mhz block, in the range of 93 Mhz to 519 Mhz. This card receives DTCP encrypted IP video from the GigE backplane and converts it to NTSC analog signals.

NTSC Data Flow—As shown in the figure, the backplane GigE signals are passed through the GigE Switch to the High Density Decoders. Four transport streams are decrypted and presented to the decode cores to within each decoder (ViXS XCode PRO200). Each decoder decodes and scales (or crops) the digital baseband output to SD 720×480 (480i) resolution. Using the decoders' PCIe interface the baseband data (approximately 200 mbps×4) are passed to the FPGA vie PCIe. This includes video, audio and closed caption data.

The FPGA function may chroma resample the incoming 4:2:0 video data, and NTSC modulate the 24 channels, including stereo audio and line 21 closed caption data. These 24 channels are generally then up converted (digitally) and passed to a high speed DAC and output via the gain stages/filter. Cable tilt compensation is handled by adjusting gain on individual channels digitally. Post tilt compensation, the RF output level may be adjustable over a 10 dB range in one or more embodiments.

Figure 13:
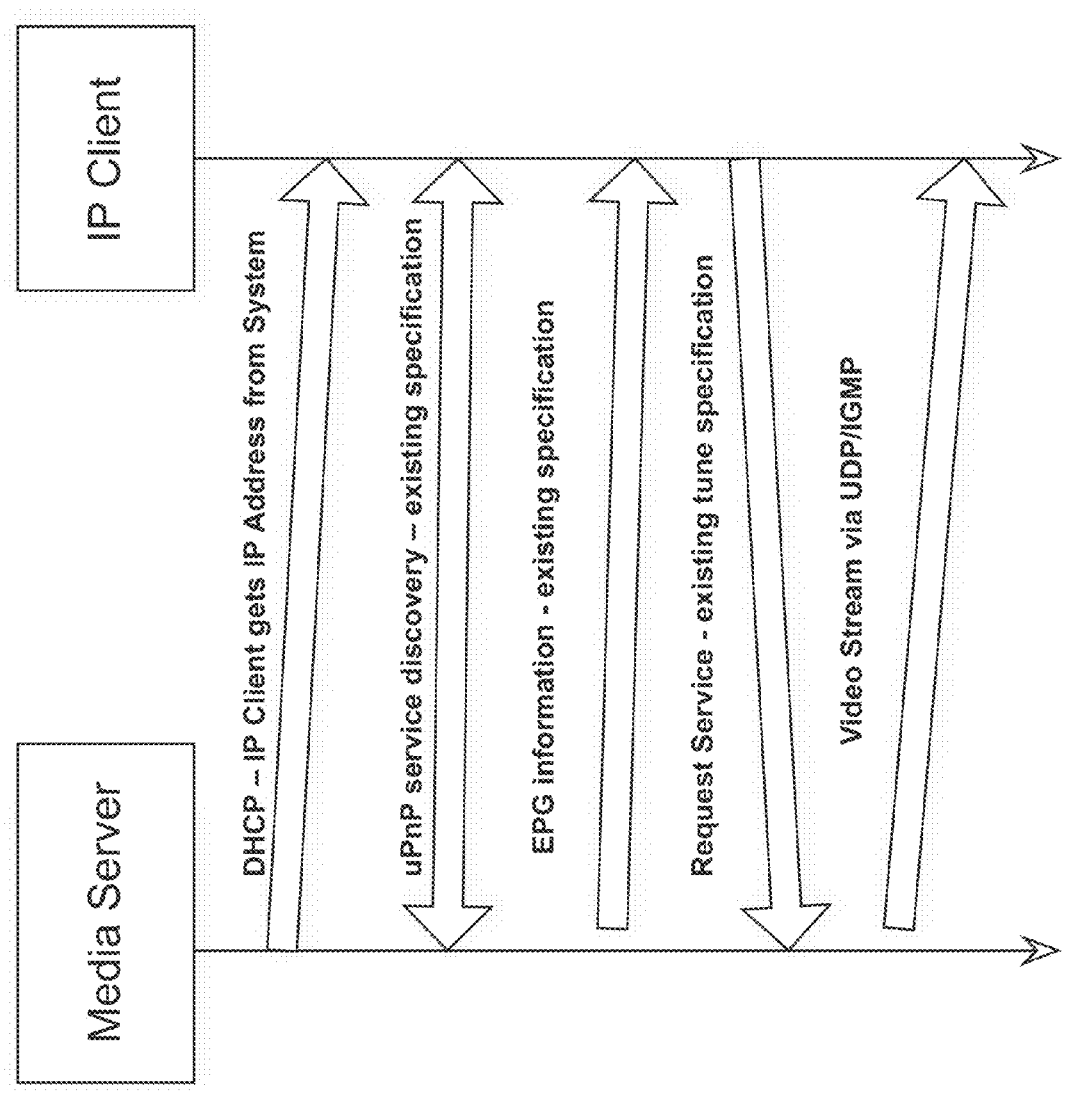
FIG. 13 shows a slave set-top box interaction with the system.

FIG. 13 shows a slave set-top box interaction with the system. The slave set-top box, i.e., the IP Client STB that normally connects to a master set-top box. The IP Client can access live TV and recorded TV via the IP contention to the STB. In the system, the IP Client STB may tune to live TV channels provided to it by the system.

The IP Client may include modifications to the current software to work with embodiments of the system. The system supports the following features across the interface to the IP Client:

1. IP address assignment is via a DHCP server in the default case.

2. Service discovery—the system and the IP Client can discover each other via uPnP. This assumes a private network or a VLAN with no other traffic and a DHCP server has provided the IP Client with a valid IP address.

3. The system responds to messages asking for EPG/SDT information from the IP Client.

4. The IP Client may request a search for services which are available on Live TV. As the system generally is provided without DVR functionality, stored video may generally not be returned in the searches.

5. The system provides system and channel change messages.

6. The system may send video as both unicast and multicast UDP/IP video streaming (Connectionless streaming) rather than file or HTTP based video reading (Transaction based transfer).

7. For multicast IP streaming the IP Client is notified by the system of an IP address and port that the video is streamed on.

8. For unicast IP streams the stream is sent direct to the IP Client's IP address at a UDP port the video assigned by the system.

As shown in FIG. 14, the boot process and communication to and from an IP Client includes providing an IP address to the IP Client, uPnP service discovery, EPG information, receiving a request for service and video streaming via UDP/GMP as is shown from top to bottom in the figure.

Embodiments of the invention enable excellent preventive monitoring. Preventive monitoring may be applied to fans such that their failure can be predicted by monitoring the drive current at the stall speed of the fan. Therefore, by measuring the current and reporting this back to the company's network operations center, the fan replacement can be scheduled rather than waiting for the unit to fail in the middle of the weekend and causing a hotel or MDU to be without TV until Monday or when a service technician can be dispatched. This type of preventative monitoring illustrates the point of having 24×7 operations with only 5×10 onsite support. This can limit the down time to scheduled maintenance and limit the amount of scheduled maintenance to a minimal numbers of times a year with the desired quality goals.

While the invention herein disclosed has been described by means of specific embodiments and applications thereof, numerous modifications and variations could be made thereto by those skilled in the art without departing from the scope of the invention set forth in the claims.

What is claimed is:

1. A switched RF and IP audio/video processing and distribution appliance comprising:

a radio frequency L Band switch configured to receive a plurality of radio frequency signals from a respective plurality of Low Noise Blocks coupled with at least one external satellite dish;

a plurality of satellite receivers coupled with said radio frequency L Band switch wherein said plurality of satellite receivers are configured to receive radio frequency signals determined by said L Band switch;

an Internet Protocol bus coupled with said plurality of satellite receivers and configured to communicate digital information output from said plurality of satellite receivers with Internet Protocol;

at least one output modulator configured to receive said information in said Internet Protocol and output said information in a predetermined signal format compatible with a first type of audio/visual equipment;

a controller coupled with at least said radio frequency L Band switch and configured to select the specific plurality of radio frequency signals from said plurality of Low Noise Blocks to provide to said plurality of satellite receivers; and, a chassis configured to hold said radio frequency L Band switch, said plurality of satellite receivers, said Internet Protocol bus, said at least one output modulator and said controller.

2. The apparatus of claim 1 wherein said radio frequency L Band switch is configured to output said plurality of radio frequency signals at a fixed set of frequencies for each of said plurality of satellite receivers.

3. The apparatus of claim 1 wherein said radio frequency L Band switch comprises at least one power detector coupled with an A/D converter to output a visual indication of power associated with a satellite input.

4. The apparatus of claim 1 wherein said plurality of satellite receivers are configured to demodulate said radio frequency signals.

5. The apparatus of claim 4 wherein said plurality of satellite receivers are configured to demultiplex data associated with said radio frequency signals into Single-Program Transport Streams.

6. The apparatus of claim 5 wherein said plurality of satellite receivers are configured to decrypt said Single-Program Transport Streams, transcode said Single-Program Transport Streams into a different format, and encrypt said different format.

7. The apparatus of claim 1 further comprising:
a QAM/8VSB receiver configured to receive off-air radio frequency television signals or signals from a cable modem, wherein said QAM/8VSB receiver is coupled with said Internet Protocol bus.

8. The apparatus of claim 1 wherein said at least one output modulator comprises a QAM output processor.

9. The apparatus of claim 1 wherein said at least one output modulator comprises a QAM output processor comprising a QAMx output and a QAM demodulator, wherein said QAMx output is coupled with said QAM demodulator and utilized to display a view of power on an output channel.

10. The apparatus of claim 1 wherein said at least one output modulator comprises an NTSC output processor.

11. The apparatus of claim 1 wherein said at least one output modulator comprises a media server configured to provide rich guide content and programs to thin clients over Internet Protocol.

12. The apparatus of claim 1 wherein said at least one output modulator comprises a wireless modem, or a 3G or a 4G or an LTE modem.

13. The apparatus of claim 1 further comprising:
an SPTS input configured to receive a Welcome Channel, security feed or advertisement feed.

14. The apparatus of claim 1 wherein said controller is configured to select a particular one of said plurality of satellite receivers as a master and switch said master if said particular one of said plurality of satellite receivers fails.

15. The apparatus of claim 1 further comprising:
at least one temperature sensor within said chassis and coupled with said controller and wherein said controller is configured to command said at least one of said plurality of satellite receivers to stop processing at least one of said radio frequency signals if said at least one temperature sensor detects a temperature over a predefined temperature value.

16. The apparatus of claim 1 further comprising:
at least one fan within said chassis having a speed sensor coupled with said controller and wherein said controller is configured to command said at least one of said plurality of satellite receivers to stop processing at least one of said radio frequency signals if said speed sensor detects a speed under a predefined speed value.

17. The apparatus of claim 15 further comprising:
wherein at least one of said radio frequency signals is assigned a priority and wherein said priority is utilized to determine which of said radio frequency signals to continue to process in case of
bandwidth or processing overload of any component within said chassis, or
if a temperature within said chassis exceeds a predefined temperature value or
a speed of a fan within said chassis falls beneath a predefined speed value.

18. The apparatus of claim 1 further comprising:
at least one power supply coupled with at least said plurality of satellite receivers and said at least one output component and wherein said at least one power supply is hot-swappable.

19. A switched RF and IP audio/video processing and distribution appliance comprising:
a radio frequency L Band switch configured to receive a plurality of radio frequency signals from a respective plurality of Low Noise Blocks coupled with at least one external satellite dish;
a plurality of satellite receivers coupled with said radio frequency L Band switch wherein said plurality of satellite receivers are configured to receive radio frequency signals determined by said L Band switch;
at least one QAM/8VSB receiver configured to receive off-air radio frequency television signals;
an Internet Protocol bus coupled with said plurality of satellite receivers and said at least one QAM/8VSB receiver and configured to communicate digital information output from said plurality of satellite receivers and said QAM/8VSB receiver with Internet Protocol;
at least one output modulator configured to receive said information in said Internet Protocol and output said information in a predetermined signal format compatible with a first type of audio/visual equipment;
a controller coupled with at least said radio frequency L Band switch and configured to select the specific plurality of radio frequency signals from said plurality of Low Noise Blocks to provide to said plurality of satellite receivers and further configured to select a particular one of said plurality of satellite receivers as a master and switch said master if said particular one of said plurality of satellite receivers fails; and,
a chassis configured to hold said radio frequency L Band switch, said plurality of satellite receivers, said Internet Protocol bus, said at least one output modulator and said controller.

20. A switched RF and IP audio/video processing and distribution appliance comprising:
a radio frequency L Band switch configured to receive a plurality of radio frequency signals from a respective plurality of Low Noise Blocks coupled with at least one external satellite dish, wherein said radio frequency L Band switch is configured to output said plurality of radio frequency signals at a fixed set of frequencies;

a plurality of satellite receivers coupled with said radio frequency L Band switch wherein said plurality of satellite receivers are configured to receive radio frequency signals determined by said L Band switch at said fixed set of frequencies and wherein said plurality of satellite receivers are configured to
   demultiplex data associated with said radio frequency signals into Single-Program Transport Streams,
   decrypt said Single-Program Transport Streams,
   transcode said Single-Program Transport Streams into a different format,
   encrypt said Single-Program Transport Streams;
at least one QAM/8VSB receiver configured to receive off-air radio frequency television signals;
an SPTS input configured to receive a Welcome Channel, security feed or advertisement feed;
an Internet Protocol bus coupled with said plurality of satellite receivers, said at least one QAM/8VSB receiver and said SPTS input and configured to communicate digital information output from said plurality of satellite receivers, said QAM/8VSB receiver and said SPTS input with Internet Protocol;
at least one output modulator configured to receive said information in said Internet Protocol and output said information in a predetermined signal format compatible with a first type of audio/visual equipment wherein said predetermined signal format comprises QAM, NTSC, Internet Protocol or a wireless communication format;
a controller coupled with at least said radio frequency L Band switch and configured to select the specific plurality of radio frequency signals from said plurality of Low Noise Blocks to provide to said plurality of satellite receivers and further configured to select a particular one of said plurality of satellite receivers as a master and switch said master if said particular one of said plurality of satellite receivers fails;
at least one temperature sensor within said chassis and coupled with said controller and wherein said controller is configured to command said at least one of said plurality of satellite receivers to stop processing at least one of said radio frequency signals if said at least one temperature sensor detects a temperature over a predefined temperature value;
at least one fan within said chassis having a speed sensor coupled with said controller and wherein said controller is configured to command said at least one of said plurality of satellite receivers to stop processing at least one of said radio frequency signals if said speed sensor detects a speed under a predefined speed value;
wherein at least one of said radio frequency signals is assigned a priority and wherein said priority is utilized to determine which of said radio frequency signals to continue to process in case of
   bandwidth or processing overload of any component within said chassis, or
   if a temperature within said chassis exceeds a predefined temperature value or
   a speed of a fan within said chassis falls beneath a predefined speed value;
at least one power supply coupled with at least said plurality of satellite receivers and said at least one output component and wherein said at least one power supply is hot-swappable; and,
a chassis configured to hold said radio frequency L Band switch, said plurality of satellite receivers, said Internet Protocol bus, said at least one output modulator and said controller.

* * * * *